US012566510B2

(12) United States Patent　　(10) Patent No.: US 12,566,510 B2
Tanaka et al.　　(45) Date of Patent: Mar. 3, 2026

(54) ELECTRONIC PEN

(71) Applicant: Wacom Co., Ltd., Saitama (JP)

(72) Inventors: Kohei Tanaka, Saitama (JP); Takenori Kaneda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/913,670

(22) Filed: Oct. 11, 2024

(65) Prior Publication Data

US 2025/0036215 A1　Jan. 30, 2025

Related U.S. Application Data

(63) Continuation of application No. PCT/JP2023/000524, filed on Jan. 12, 2023.

(30) Foreign Application Priority Data

Jun. 22, 2022　(JP) ................................. 2022-100263

(51) Int. Cl.
　G06F 3/0354　　(2013.01)
　G06F 1/26　　(2006.01)
　　　(Continued)

(52) U.S. Cl.
　CPC ............ G06F 3/03545 (2013.01); G06F 1/26 (2013.01); G06F 3/0383 (2013.01); G06F 3/046 (2013.01)

(58) Field of Classification Search
　CPC ...... G06F 3/03545; G06F 1/26; G06F 3/0383; G06F 3/046; G06F 3/0354; G06F 3/03
　See application file for complete search history.

(56) References Cited

U.S. PATENT DOCUMENTS

2014/0050516 A1* 2/2014 Lazaridis ........... G06V 30/1423
　　　　　　　　　　　　　　　　　　401/195
2018/0314351 A1* 11/2018 Kaneda .................... B43K 7/02
　　　　　　　　(Continued)

FOREIGN PATENT DOCUMENTS

JP　　2013161307 A　　8/2013
JP　　2021532489 A　　11/2021
　　　　　(Continued)

OTHER PUBLICATIONS

Machine Translation of WO 2012/119517 A1 (Year: 2012).*
(Continued)

*Primary Examiner* — Patrick N Edouard
*Assistant Examiner* — Joseph P Fox
(74) *Attorney, Agent, or Firm* — Seed Intellectual Property Law Group LLP

(57)　　　ABSTRACT

An electronic pen includes an electronic pen body portion unit, a power supply portion unit that supplies a power supply voltage to the electronic pen body portion unit, and a first housing portion and a second housing portion that form an electronic pen outer casing. The electronic pen body portion unit has a columnar shape, wherein a core body can be installed on one end side in the axial direction, and an electrical first terminal portion is included on another end side in the axial direction. The power supply portion unit includes a second terminal portion. In a columnar housing space of the electronic pen outer casing, the electronic pen body portion unit and the power supply portion unit are lined up and arranged in the axial direction to remain in position in the axial direction, and the first terminal portion and the second terminal portion are electrically connected.

19 Claims, 13 Drawing Sheets

(51) Int. Cl.
  G06F 3/038        (2013.01)
  G06F 3/046        (2006.01)

(56)            References Cited

U.S. PATENT DOCUMENTS

2020/0089340 A1 *   3/2020   Ruscher ................ G06F 3/0383
2021/0291580 A1 *   9/2021   Tanaka .................. B43K 29/08

FOREIGN PATENT DOCUMENTS

WO      WO-2012119517 A1 *   9/2012   ......... G06F 3/03545
WO      WO 2017010336 A1     1/2017
WO      WO 2020144929 A1     7/2020
WO      WO 2020148977 A1     7/2020

OTHER PUBLICATIONS

International Search Report dated Mar. 20, 2023, for the corresponding International Application No. PCT/JP2023/000524, 4 pages. (With English Translation).

* cited by examiner

FIG.6A
FIG.6B
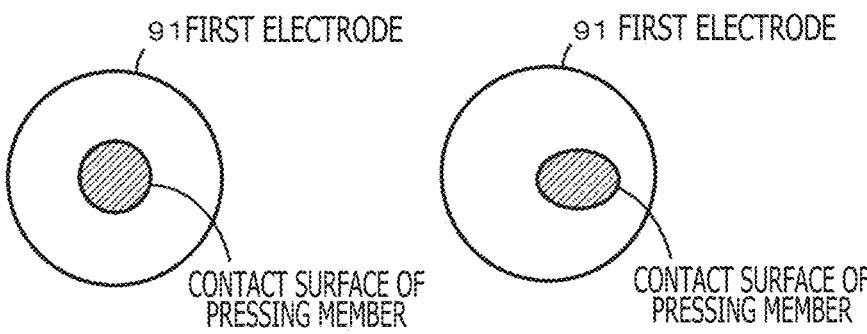
FIG.7A
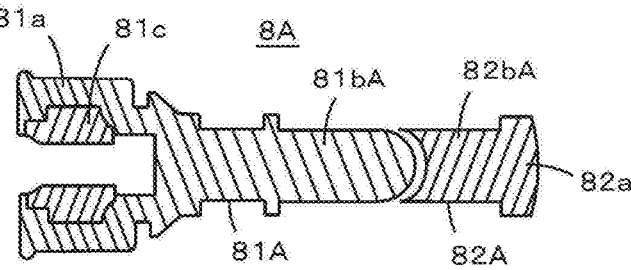
FIG.7B
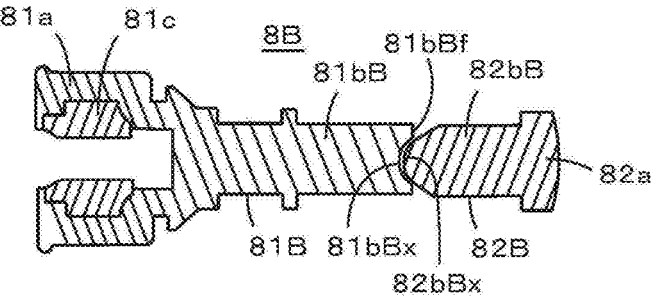
FIG.7C
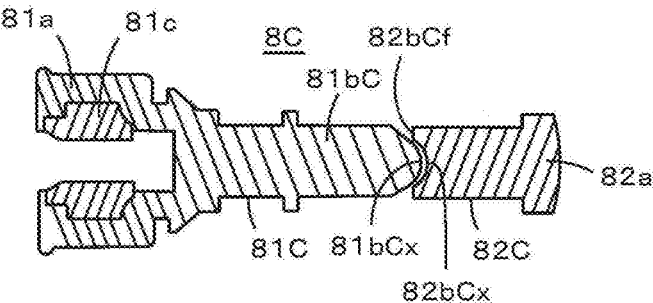

F I G . 1 1
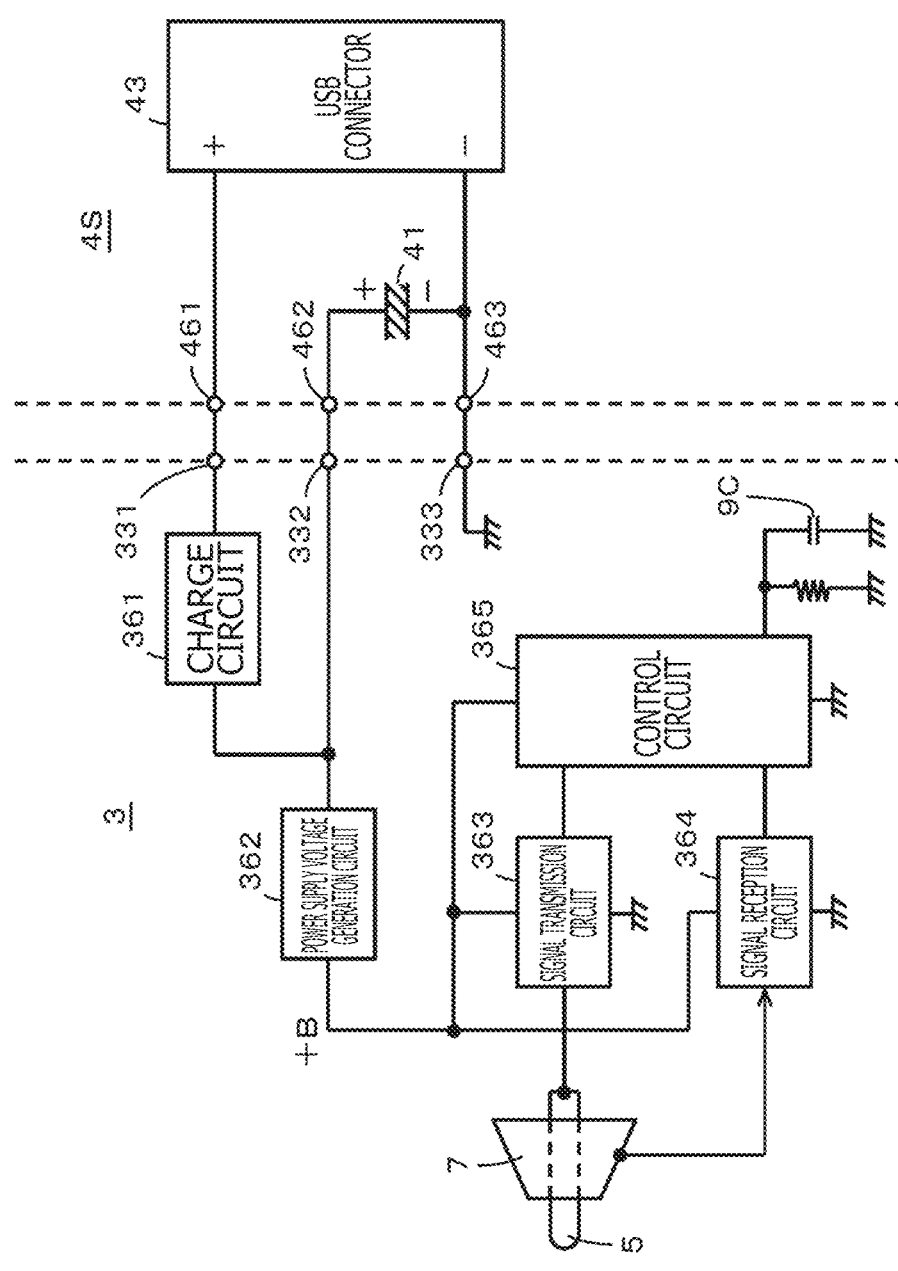

FIG.14A
FIG.14B
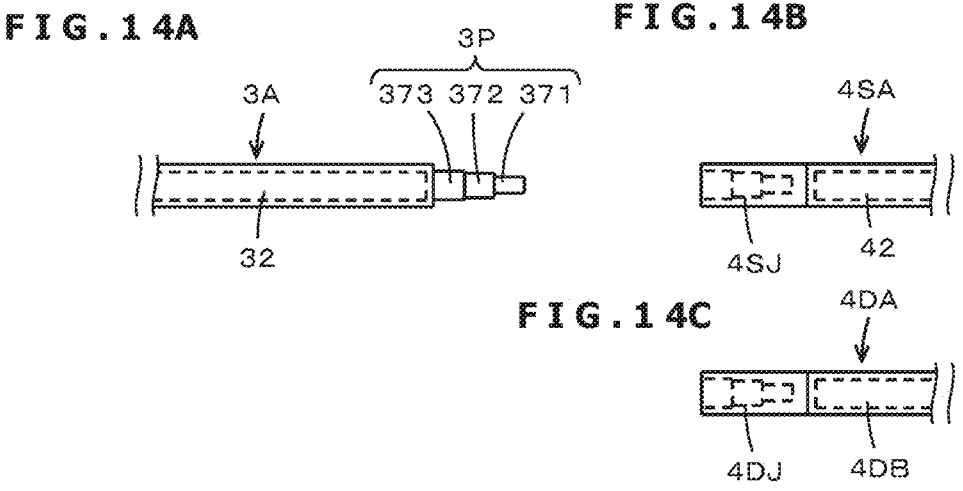
FIG.14C
FIG.14D
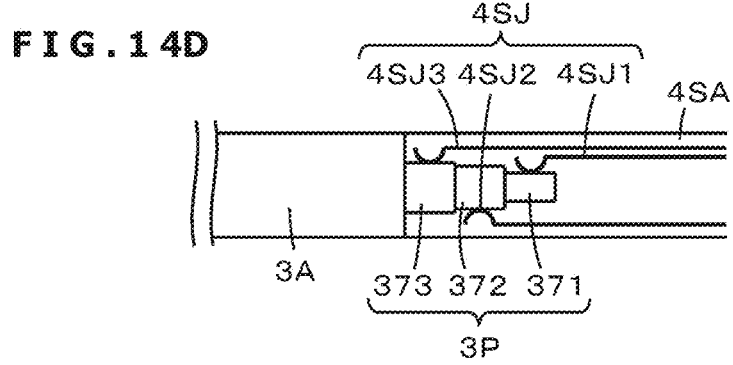
FIG.14E
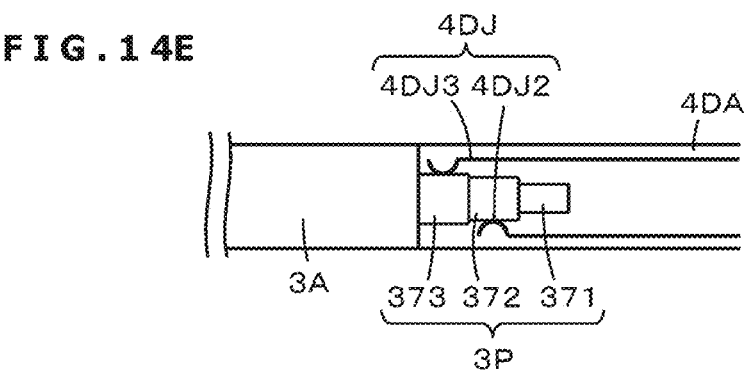
FIG.14F
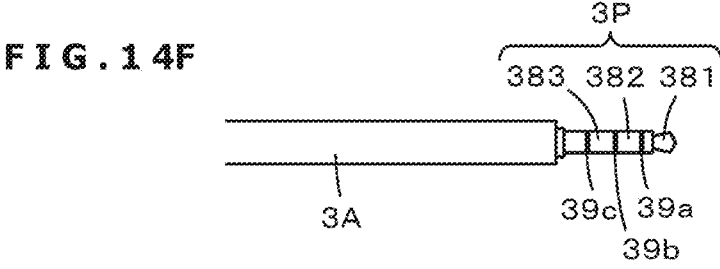

ELECTRONIC PEN

BACKGROUND

Technical Field

The disclosure relates to an electronic pen with a function of interaction of a signal to and from a position detection sensor, and particularly, to an electronic pen in which a primary battery or a secondary battery is used as a power supply.

Description of the Related Art

Examples of well-known electronic pens include an electronic pen with an active capacitance system and an electronic pen with an electromagnetic resonance system. The electronic pen with an active capacitance system includes a signal transmission circuit that transmits a signal that interacts with a position detection sensor, and a power supply portion that supplies a power supply voltage to the signal transmission circuit. In addition, when pen pressure information and identification information are to be transmitted as digital information to an electronic device side, including a position detection sensor, the electronic pen with an electromagnetic resonance system also includes a circuit that generates the digital information and a power supply portion that supplies a power supply voltage to the circuit.

In the conventional electronic pen, regardless of whether the electronic pen is an electronic pen with an active capacitance system or an electronic pen with an electromagnetic resonance system, the section with the function of interaction of the signal to and from the position detection sensor (functional section of electronic pen body portion) and the power supply portion are electrically connected. The section and the power supply portion are housed in a columnar housing space inside an electronic pen outer casing.

Recently, an electronic pen is also proposed as illustrated, for example, in Patent Literature 1 and Patent Literature 2, in which a module of internal parts of the electronic pen is formed, and the module is housed in a columnar housing space inside an electronic pen outer casing. In this case, the functional section of the electronic pen body portion with the function of interaction of a signal to and from the position detection sensor and the power supply portion are also electrically connected, and one module part is formed.

PRIOR ART DOCUMENT

Patent Document

Patent Literature 1: Republished Patent No. 2020/148977
Patent Literature 2: Republished Patent No. 2017/010336

BRIEF SUMMARY

Technical Problem

However, in the electronic pen with the conventional configuration, only a core body including a pen tip is replaceable, and the entire electronic pen needs to be replaced when the electronic pen outer casing of the electronic pen is damaged or when some of the internal parts are broken.

Therefore, the internal module that normally operates is also discarded when the electronic pen outer casing of the electronic pen is damaged. In addition, the power supply portion that is normal is also discarded when a section other than the power supply portion of the module part is damaged, and furthermore, the other sections of the module part that are not broken are also discarded when only part of the power supply portion is broken.

Such a situation is not preferable in terms of sustainability, and an increase in the repairability of the electronic pen is desired.

An aspect of the disclosure is directed to providing an electronic pen that can solve the problem.

Technical Solution

To solve the problem, provided is an electronic pen including an electronic pen body portion unit with a function of interaction of a signal to and from a position detection sensor, a power supply portion unit that supplies a power supply voltage to the electronic pen body portion unit, and a first housing portion and a second housing portion that form an electronic pen outer casing including a columnar housing space inside when the first housing portion and the second housing portion are coupled in an axial direction of the columnar housing space. The electronic pen body portion unit has a columnar shape allowing housing of the electronic pen body portion unit in the columnar housing space, wherein a core body can be installed on one end side of the columnar shape in the axial direction. The electronic pen body portion unit includes an electrical first terminal portion on an opposite side of the side on which the core body is installed. The power supply portion unit has a columnar shape allowing housing of the power supply portion unit in the columnar housing space and includes, on the one end side of the columnar shape in the axial direction, a second terminal portion electrically connected to at least part of the first terminal portion of the electronic pen body portion unit. In the columnar housing space of the electronic pen outer casing, the electronic pen body portion unit and the power supply portion unit are lined up and arranged in the axial direction of the columnar housing space in a state in which the power supply portion unit is on a back end side and they cannot be moved in the axial direction of the columnar housing space, and the first terminal portion and the second terminal portion are electrically connected.

In the electronic pen with the above-described configuration, the constituent parts include four parts including the electronic pen body portion unit, the power supply portion unit, the first housing portion, and the second housing portion. In addition, the electronic pen can be formed just by housing the electronic pen body portion unit and the power supply portion unit in the columnar housing space of the electronic pen outer casing, including the first housing and the second housing, such that the electronic pen body portion unit and the power supply portion unit are coupled in the axial direction.

Therefore, when one of the four parts is damaged in the electronic pen with the configuration, only the damaged part can be replaced to repair the electronic pen, and the repairability of the electronic pen can be increased.

BRIEF DESCRIPTION OF THE SEVERAL VIEWS OF THE DRAWINGS

FIGS. 6A-6B depict diagrams used for describing the configuration of the pen tip side of the electronic pen body portion unit illustrated in FIGS. 5A-5B.

FIGS. 7A-7C depict diagrams used for describing the configuration of the pen tip side of the electronic pen body portion unit illustrated in FIGS. 5A-5B.

FIG. 11 is a circuit diagram for describing the electrical connection in the configuration in which the power supply portion unit uses the secondary battery as a power supply and the electronic pen body portion unit are coupled in the embodiment of the electronic pen according to the disclosure.

FIGS. 14A-14F depict diagrams for describing another configuration example of the electrical connection of the coupling portion of the electronic pen body portion unit and the power supply portion unit in the embodiment of the electronic pen according to the disclosure.

DETAILED DESCRIPTION

Hereinafter, an embodiment of an electronic pen according to the disclosure will be described with reference to the drawings. The embodiment of the electronic pen described below illustrates a case of an electronic pen of active capacitance system.

Overview of Configuration of Electronic Pen of Embodiment

An electronic pen 1 of the embodiment corresponds to both a secondary battery and a primary battery as power supplies. The case of using the secondary battery as a power supply and the case of using the primary battery as a power supply are realized just by replacing a power supply portion unit described below.

FIG. 1 depicts diagrams for describing an overview of the configuration of the electronic pen 1 of the embodiment in the case of using the secondary battery as a power supply. In addition, FIG. 2 depicts diagrams illustrating an overview of the configuration in the case of using the primary battery as a power supply. Only the power portion units as unit parts are different between the configuration illustrated in FIG. 1 and the configuration illustrated in FIG. 2, and the other unit parts are the same (common).

Figures 1A, 1B, 1C:
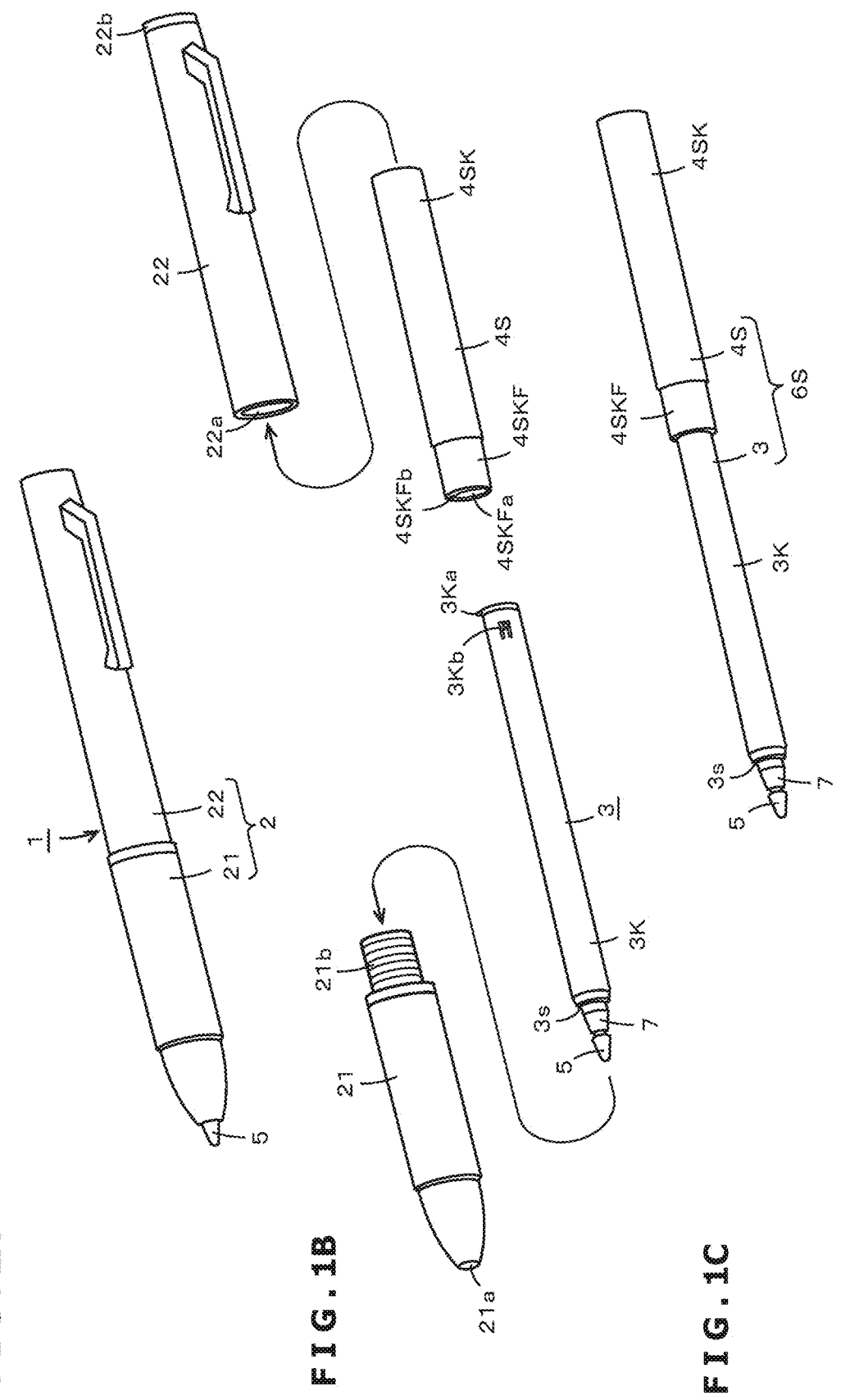
FIGS. 1A-1C depict exploded perspective views for describing an overview of an embodiment of an electronic pen according to the disclosure and illustrate a case of using a secondary battery as a power source.
Figures 2A, 2B, 2C:
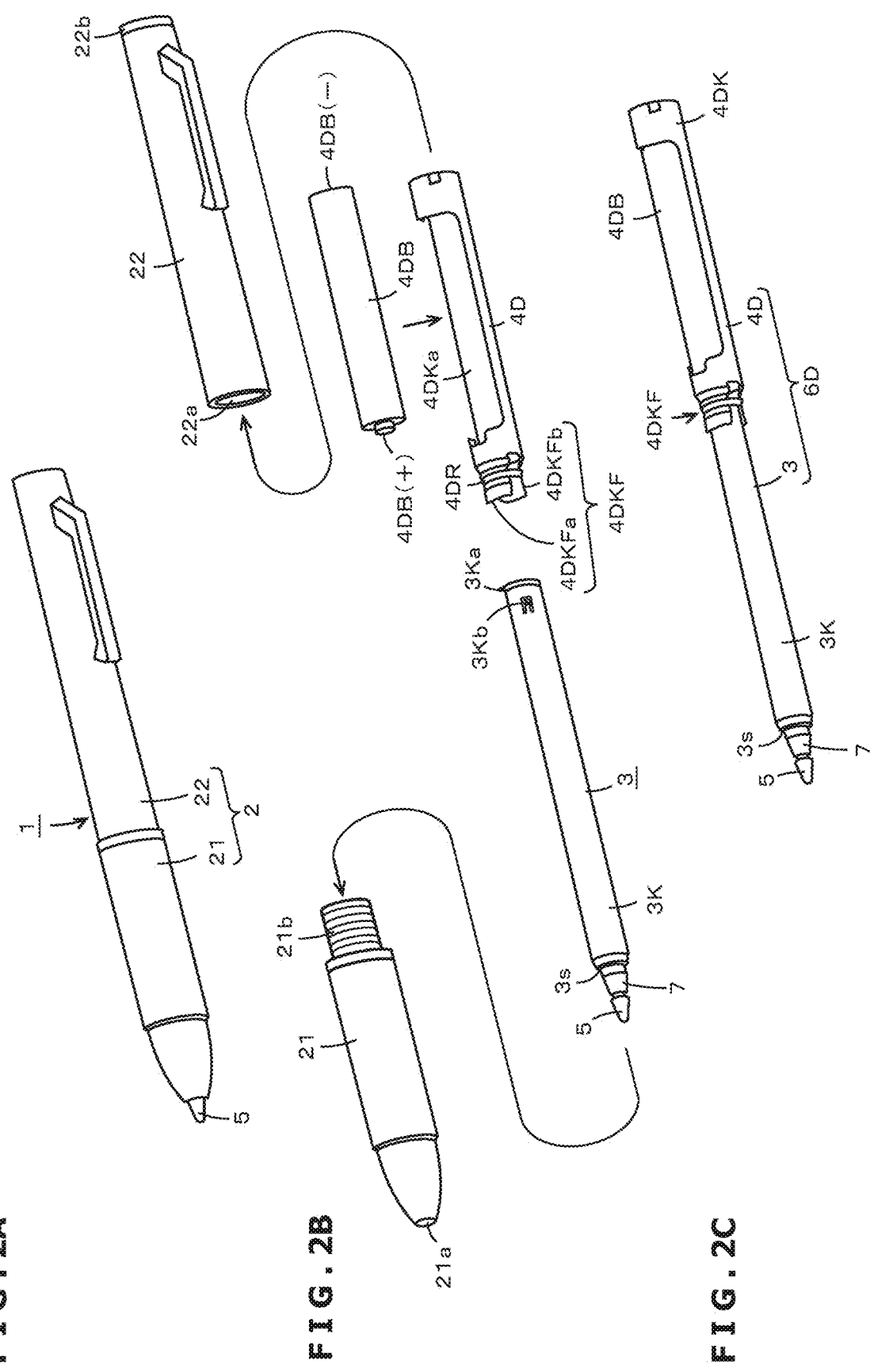
FIGS. 2A-2C depict exploded perspective views for describing the overview of the embodiment of the electronic pen according to the disclosure and illustrate a case of using a primary battery as a power source.

FIG. 1A and FIG. 2A are diagrams illustrating an appearance of the assembled electronic pen 1, and nothing is different between FIG. 1A and FIG. 2A. In addition, FIG. 1B and FIG. 2B are exploded perspective views for describing constituent parts of the electronic pen 1 of the embodiment, and only the configurations of the power supply portion units are different as described above. Furthermore, FIG. 1C and FIG. 2C are diagrams illustrating a state in which unit parts housed inside an electronic pen outer casing 2 of the electronic pen 1 of the embodiment are integrally coupled, and only the configurations of the power supply portion units are different between FIG. 1C and FIG. 2C.

The electronic pen outer casing 2 of the electronic pen 1 of the embodiment has an elongated cylindrical shape including a columnar housing space inside. The electronic pen outer casing 2 is formed by removably coupling a first housing portion and a second housing portion that are two unit parts divided in the axial direction of the cylindrical shape. As illustrated in FIGS. 1A, 1B, 2A, and 2B, the electronic pen outer casing 2 in the example includes a pen tip side housing portion 21 as an example of the first housing portion and a back end side housing portion 22 as an example of the second housing portion.

The pen tip side housing portion 21 has a cylindrical shape including a hollow space inside, and the shape of one end side in the axial direction, which is a pen tip side, gradually becomes narrower as illustrated in FIG. 1B and FIG. 2B. On the pen tip side, the pen tip side housing portion 21 includes an opening 21a for a front end portion of a core body described later to protrude outside. In addition, a back end side of the pen tip side housing portion 21 in the axial direction that is the opposite side of the pen tip side is an opening, and a screw portion 21b for coupling the pen tip side housing portion 21 and the back end side housing portion 22 by screwing is formed in the example on a circumferential wall surface near the opening on the back end side.

The back end side housing portion 22 has a cylindrical shape, including a hollow space inside as illustrated in FIG. 1B and FIG. 2B, and an inner threaded portion (not illustrated in FIG. 1B and FIG. 2B) to engage with the screw portion 21b of the pen tip side housing portion 21 is formed on an inner wall surface of an opening 22a on one end side in the axial direction that is the pen tip side housing portion 21 side. In addition, a lid portion 22b that blocks the opening is provided on a back end side of the back end side housing portion 22 in the axial direction that is the opposite side of the pen tip side. In the electronic pen 1 of the embodiment, the lid portion 22b can be attached to and detached from a back end side opening of the back end side housing portion 22 by, for example, screwing. Note that, instead of screwing the lid portion 22b to the back end side opening of the back end side housing portion 22, the lid portion 22b may be press-fitted to the back end side opening or fitted to the back end side opening with a click sound by using a ring-shaped projection portion and a ring-shaped recess portion.

In addition, the pen tip side housing portion 21 and the back end side housing portion 22 are screwed at the screw portion 21*b* of the pen tip side housing portion 21 to form the electronic pen outer casing 2 of the electronic pen 1 in the embodiment, and the hollow space of the pen tip side housing portion 21 and the hollow space of the back end side housing portion 22 communicate to form a columnar housing space 2*a* inside (see FIG. 3 described later).

In the electronic pen 1 of the embodiment, unit parts housed in the columnar housing space 2*a* of the electronic pen outer casing 2 include two unit parts including an electronic pen body portion unit 3 and a power supply portion unit. In the embodiment, either one of two types of power supply portion units can be used, the two types of power supply portion units including a power supply portion unit 4S including a secondary battery as a power supply illustrated in FIG. 1B and a power supply portion unit 4D including a primary battery as a power supply illustrated in FIG. 2B. One of the two types is selected and coupled to the electronic pen body portion unit 3 to form the electronic pen 1. Therefore, the electronic pen 1 of the embodiment includes four unit parts including the pen tip side housing portion 21, the back end side housing portion 22, the electronic pen body portion unit 3, and one of the power supply portion units 4S and 4D.

In a unit housing 3K, with a columnar shape that allows housing of the unit housing 3K in the columnar housing space 2*a* of the electronic pen outer casing 2, the electronic pen body portion unit 3 in the example includes an electronic pen body functional unit with a capacitance system, including a signal transmission circuit that transmits a signal for interaction with a position detection sensor as illustrated in FIG. 1B and FIG. 2B. In the example, the unit housing 3K includes a metal pipe containing conductive metal, such as SUS (Stainless Used Steel).

In the electronic pen body portion unit 3 according to the embodiment, a pen tip side of a peripheral electrode 7 described later (see FIG. 4 and FIG. 5) as a part of the electronic pen body functional unit protrudes from an opening of the unit housing 3K on the pen tip side as illustrated in FIGS. 1B, 1C, 2B, and 2C. In addition, a core body 5 is removably installed on the electronic pen body functional unit inside the unit housing 3K, from the opening of the peripheral electrode 7 on the pen tip side.

Furthermore, in the embodiment, a terminal portion including a plurality of points of contact in the example for electrical connection to the power supply portion units 4S and 4D is formed on an end surface of the electronic pen body portion unit 3 on a back end side that is the opposite side of the pen tip side as described later, although not illustrated in FIG. 1B and FIG. 2B.

Furthermore, in the example, one or a plurality of (two in the example) elastic protrusions 3Kb formed by processing part of the unit housing 3K are provided on a side surface of the electronic pen body portion unit 3 on the back end side of the unit housing 3K of the electronic pen body portion unit 3 as illustrated in FIG. 1B and FIG. 2B. A section of the elastic protrusion 3Kb protruding from a circumferential side surface of the unit housing 3K can be elastically displaced in a direction orthogonal to the circumferential side surface.

As described above, in the embodiment, the power supply portion unit 4S, including the second battery as illustrated in FIG. 1B and FIG. 1C and the power supply portion unit 4D housing a removable primary battery 4DB as illustrated in FIG. 2B and FIG. 2C that are power supply portion units to be coupled to the electronic pen body portion unit 3 can be exchanged and installed on the electronic pen body portion unit 3.

As illustrated in FIG. 1B, in a unit housing 4SK with a columnar shape that allows housing of the unit housing 4SK in the columnar housing space 2*a* of the electronic pen outer casing 2, the power supply portion unit 4S in the example houses: the secondary battery as a power supply that supplies a power supply voltage to the electronic pen body portion unit 3; a terminal portion on the side coupled to the electronic pen body portion unit 3; and a charge terminal on the back end side, although not illustrated in FIG. 1B. The unit housing 4SK of the power supply portion unit 4S includes a cylinder containing an insulating material, which is a resin in the example. Note that a charge circuit is provided on the electronic pen body portion unit 3 in the embodiment.

Furthermore, on the side of the unit housing 4SK coupled to the electronic pen body portion unit 3, the power supply portion unit 4S in the embodiment is provided with a fitting portion 4SKF including a recess portion 4SKFa to which the back end side of the electronic pen body portion unit 3 is fitted. In addition, the terminal portion includes a contact portion including a plurality of points of contact provided on a bottom surface (end surface in the direction orthogonal to the axial direction) of the recess portion 4SKFa of the fitting portion 4SKF of the power supply portion unit 4S. The plurality of points of contact are brought into contact with and electrically connected to the plurality of points of contact of the terminal portion on the back end side end surface of the electronic pen body portion unit 3.

Furthermore, in the example, positioning members for adjusting the positions of the plurality of points of contact of the terminal portion of the electronic pen body portion unit 3 and the plurality of points of contact of the terminal portion of the power supply portion unit 4S to bring them into contact with each other are provided on the electronic pen body portion unit 3 and the power supply portion unit 4S. That is, as illustrated in FIG. 1B, a positioning projection portion 3Ka protruding slightly from the side circumferential surface of the unit housing 3K is formed near the end surface on the back end side of the unit housing 3K of the electronic pen body portion unit 3, and on the other hand, a recess groove 4SKFb, into which the positioning projection portion 3Ka is inserted and engaged, is formed on the inner wall surface of the recess portion 4SKFa of the fitting portion 4SKF of the unit housing 4SK of the power supply portion unit 4S.

A back end portion of the electronic pen body portion unit 3 is inserted into the recess portion 4SKFa of the fitting portion 4SKF of the unit housing 4SK of the power supply portion unit 4S, and the contact portion of the terminal portion on the back end side end surface of the electronic pen body portion unit 3 and the points of contact of the terminal portion on the bottom surface of the recess portion 4SKFa of the fitting portion 4SKF of the power supply portion unit 4S are brought into contact and electrically connected. In this state, the electronic pen body portion unit 3 and the power supply portion unit 4S are physically and electrically coupled to form a unit coupling part 6S as illustrated in FIG. 1C.

In this case, the electronic pen body portion unit 3 is fitted to the fitting portion 4SKF of the power supply portion unit 4S in the state in which the positioning projection portion 3Ka of the back end portion of the electronic pen body portion unit 3 is engaged with the recess groove 4SKFb of the recess portion 4SKFa of the fitting portion 4SKF of the power supply portion unit 4S. In this way, the plurality of corresponding points of contact of the terminal portions of the units 3 and 4S are brought into contact and electrically connected. Furthermore, in the unit coupling part 6S, the elastic protrusion 3Kb of the unit housing 3K presses the inner wall circumferential surface of the recess portion 4SKFa of the fitting portion 4SKF of the power supply portion unit 4 to couple and lock the electronic pen body portion unit 3 and the power supply portion unit 4S.

Furthermore, in the power supply portion unit 4D, the primary battery 4DB as a power supply that supplies the power supply voltage to the electronic pen body portion unit 3 is housed in a unit housing 4DK that can be housed in the columnar housing space 2a of the electronic pen outer casing 2 in the example as illustrated in FIG. 2B. In the unit housing 4DK of the power supply portion unit 4D of the example, the middle of the tubular body in the axial direction is an opening 4DKa for removably housing the primary battery 4DB as illustrated in FIG. 2B.

In the example, the unit housing 4DK of the power supply portion unit 4D contains a conductive material, such as conductive metal, and the unit housing 4DK is electrically connected to a spring contact electrically connected to a negative electrode side 4DB (−) of the primary battery 4DB. In the example, a positive electrode side 4DB (+) of the primary battery 4DB is exposed to the side coupled to the electronic pen body portion unit 3 in the state in which the primary battery 4DB is housed in the unit housing 4DK.

Furthermore, in the embodiment, a fitting portion 4DKF, into which the back end side of the electronic pen body portion unit 3 is inserted and fitted, is provided on the side of the unit housing 4DK of the power supply portion unit 4D coupled to the electronic pen body portion unit 3.

When the back end portion of the electronic pen body portion unit 3 is inserted into the fitting portion 4DKF of the unit housing 4DK of the power supply portion unit 4D, the back end portion of the electronic pen body portion unit 3 is elastically tightened and fitted by the fitting portion 4DKF of the unit housing 4DK as described later. In this way, the electronic pen body portion unit 3 and the power supply portion unit 4D are coupled, and a unit coupling part 6D is formed as illustrated in FIG. 2C.

Furthermore, in the embodiment, the pen tip side housing portion 21 is placed over the unit coupling part 6S as illustrated in FIG. 1C from the pen tip side, and the back end side housing portion 22 is placed over the unit coupling part 6S from the back end side. The pen tip side housing portion 21 and the back end side housing portion 22 are screwed to form the electronic pen 1 of the embodiment as illustrated in FIG. 1A that houses the power supply portion unit 4S in which the secondary battery is used as a power supply.

In addition, similarly, the pen tip side housing portion 21 is placed over the unit coupling part 6D as illustrated in FIG. 2C from the pen tip side, and the back end side housing portion 22 is placed over the unit coupling part 6D from the back end side. The pen tip side housing portion 21 and the back end side housing portion 22 are screwed to form the electronic pen 1 of the embodiment as illustrated in FIG. 2A that houses the power supply portion unit 4D in which the primary battery 4DB is used as a power supply.

That is, the electronic pen 1 of the embodiment can be formed by just preparing four unit parts including the pen tip side housing portion 21, the back end side housing portion 22, the electronic pen body unit 3, and one of the power supply portion unit 4S and the power supply portion unit 4D, coupling the electronic pen body portion unit 3 and one of the power supply portion units 4S and 4D as illustrated in FIG. 1C or FIG. 2C, and placing and coupling the pen tip side housing portion 21 and the back end side housing portion 22.

Furthermore, according to the electronic pen 1 of the embodiment, when one of the four unit parts is damaged or malfunctioned, the electronic pen 1 can be repaired just by replacing only the damaged or malfunctioned unit part, and the repairability of the electronic pen can be increased.

Figures 3A, 3B, 3C:
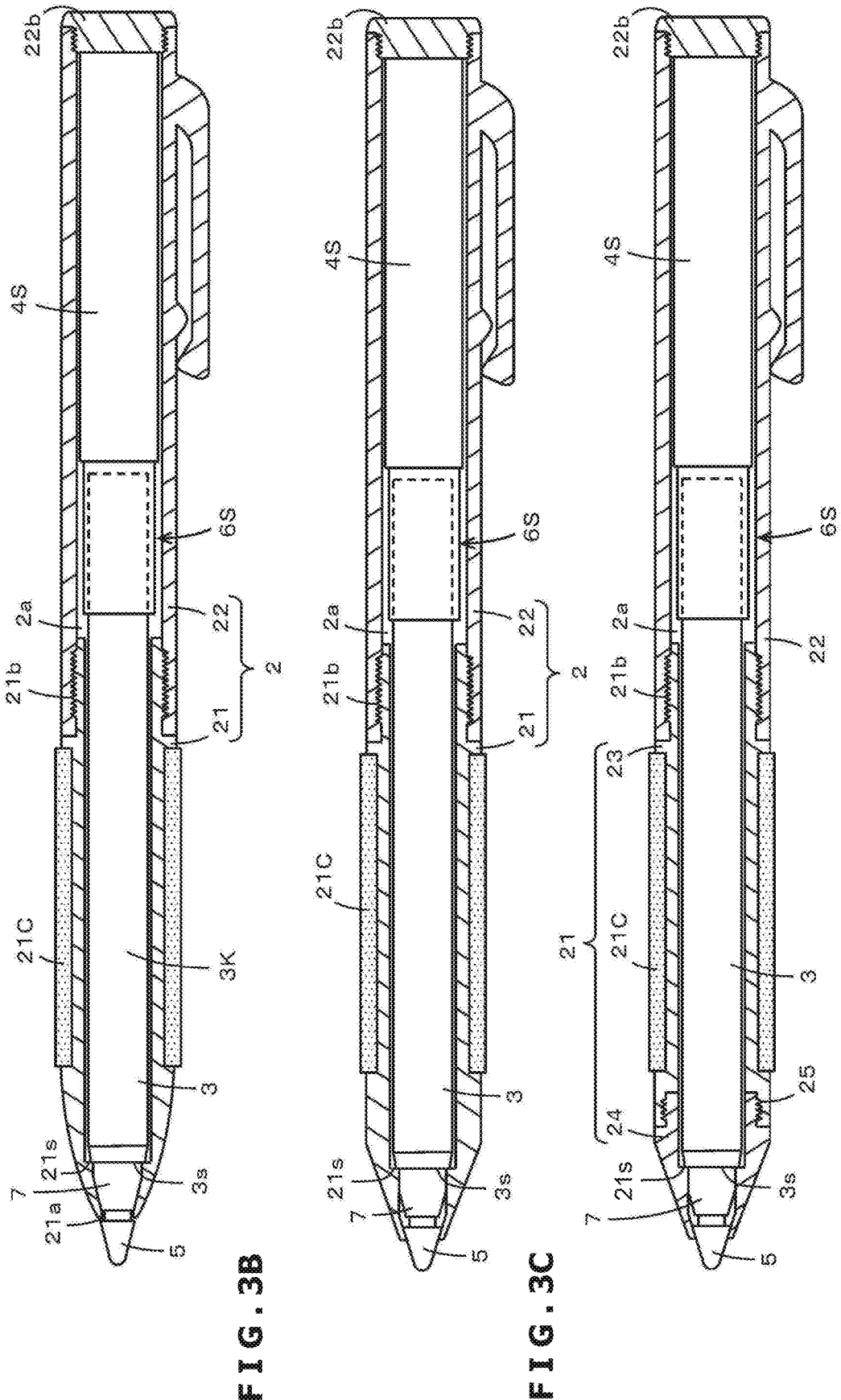
FIGS. 3A-3C depict diagrams for describing a configuration example of the embodiment of the electronic pen according to the disclosure.

FIG. 3A is a diagram in which only the pen tip side housing portion 21 and the back end side housing portion 22 included in the electronic pen outer casing 2 are cut in the electronic pen 1 of the embodiment to describe a housing state of the unit coupling part 6S in which the electronic pen body portion unit 3 and the power supply portion unit 4S are coupled in the electronic pen outer casing 2. There is no difference in the housing state of the unit coupling part 6D in which the power supply portion unit 4D and the electronic pen body portion unit 3 are coupled except that the power supply portion unit 4D is connected in FIG. 3 instead of the power supply portion unit 4S, and the housing state will not be illustrated and described here.

Note that, in the embodiment, as illustrated in FIG. 2A, a grip member 21C containing, for example, rubber is installed on the pen tip side housing portion 21 to allow the user to firmly hold the electronic pen 1 at a holding position when the user holds the electronic pen 1.

As illustrated in FIG. 3A, the length of the pen tip side housing portion 21 in the axial direction in the embodiment is such a length that the back end portion coupled to the power supply portion unit 4S is exposed outside the pen tip side housing portion 21 when the electronic pen body portion unit 3 is housed in the hollow space of the pen tip side housing portion 21.

Furthermore, the electronic pen body portion unit 3 according to the embodiment includes a step portion 3s between the pen tip side end portion of the unit housing 3K and the peripheral electrode 7 protruding from the pen tip side of the unit housing 3K as illustrated in FIG. 1B, FIG. 2B, and FIG. 3A. On the other hand, as illustrated in FIG. 3A, the diameter of a section of the hollow space of the pen tip side housing portion 21 excluding the pen tip side is larger than the diameter of the unit housing 3K of the electronic pen body portion unit 3. The diameter of the pen tip side is larger than the maximum diameter of the peripheral electrode 7 of the electronic pen body portion unit 3, but is smaller than the diameter of the unit housing 3k. In this way, a step portion 21s is formed near the pen tip side of the pen tip side housing 3K.

Therefore, as illustrated in FIG. 3A, when the electronic pen body portion unit 3 is inserted into the hollow space of the pen tip side housing portion 21 from the back end side, the step portion 3s on the pen tip side of the electronic pen body portion unit 3 collides with the step portion 21s on the pen tip side of the pen tip side housing portion 21 to restrict the movement toward the opening 21a of the pen tip side housing portion 21 in the axial direction.

Furthermore, as illustrated in FIG. 3A, the diameter of the hollow space of the back end side housing portion 22 is larger than the diameter of the unit housing 4KS of the power supply portion unit 4S, and the length in the axial direction is such a length that the back end side end portion of the power supply portion unit 4S coupled to the electronic pen body portion unit 3 and the internal end surface facing the hollow space of the lid portion 22b just collide with each other when the back end side housing portion 22 is screwed and coupled to the pen tip side housing portion 21.

In this way, the unit coupling part 6S in which the electronic pen body portion unit 3 and the power supply portion unit 4S are coupled is housed in the unmovable state in the axial direction in the columnar housing space 2a of the electronic pen outer casing 2 formed by the coupling of the pen tip side housing portion 21 and the back end side housing portion 22 as illustrated in FIG. 3A.

Furthermore, as illustrated in FIG. 3A, the core body 5 in the embodiment is installed on the electronic pen body portion unit 3 through the opening 21a of the pen tip side housing portion 21 after the unit coupling part 6S in which the electronic pen body portion unit 3 and the power supply portion unit 4S are coupled is housed in the columnar housing space 2a of the electronic pen outer casing 2. That is, the core body 5 in the embodiment can be removably installed on the electronic pen 1 in the state that the unit coupling part 6S in which the electronic pen body portion unit 3 and the power supply portion unit 4S are coupled is housed in the columnar housing space 2a of the electronic pen outer casing 2.

Furthermore, in the electronic pen 1 of the embodiment, a charge terminal for charging the secondary battery of the power supply portion unit 4S is exposed outside as described later in the state in which the lid portion 22b of the back end side housing portion 22 is removed.

In the state in which the lid portion 22b is removed, the unit coupling part 6S housed in the columnar housing space 2a of the electronic pen outer casing 2 can be removed from the back end side opening of the back end side housing portion 22, and the unit coupling part 6S can also be inserted into the columnar housing space 2a from the back end side opening of the back end side housing portion 22. Therefore, the electronic pen outer casing 2 can include a first housing portion, in which the pen tip side housing portion 21 and the back end side housing portion 22 are coupled, or the pen tip side housing portion 21 and the back end side housing portion 22 are integrally formed, and a second housing portion that is the lid portion 22b.

Incidentally, as illustrated in FIG. 3A, the core body 5 can be installed on the electronic pen body portion unit 3 through the opening 21a of the pen tip side housing portion 21 after the unit coupling part 6S in which the electronic pen body portion unit 3 and the power supply portion unit 4S are coupled is housed in the columnar housing space 2a of the electronic pen outer casing 2 in the embodiment. However, as illustrated in FIG. 3B, only the front end portion of the core body 5 may protrude from the opening 21a of the pen tip side housing portion 21, and the core body 5 may be irreplaceable in the state in which the unit coupling part 6S is housed in the internal columnar housing space 2a in the electronic pen outer casing 2. This is because in the electronic pen 1 of the embodiment, the electronic pen body portion unit 3 can be taken out from the electronic pen outer casing 2 to replace the core body 5.

Furthermore, in a modification of the example of FIG. 3B, the pen tip side housing portion 21 may be divided into a cylindrical housing portion 23 and a sleeve housing portion 24 in a cone shape, and they may be coupled by a screw portion 25 as illustrated in FIG. 3C. In the state in which the pen tip side housing portion 21 and the back end side housing portion 22 are coupled in the example of FIG. 3C, the sleeve housing portion 24 can be removed from the cylindrical housing portion 23 to expose the pen tip side of the electronic pen body portion unit 3 to the outside to remove and replace the core body 5 from the electronic pen body portion unit 3.

Therefore, in a derivative of the configuration of the example of FIG. 3C, the electronic pen outer casing 2 can include a first housing portion that is the sleeve housing portion 24, and a second housing portion, in which the cylindrical housing portion 23 of the pen tip side housing portion 21 and the back end side housing portion 22 are coupled, or the cylindrical housing portion 23 of the pen tip side housing portion 21 and the back end side housing portion 22 are integrally formed.

Next, a configuration example of the electronic pen body portion unit 3 and the power supply portion unit 4 housed in the electronic pen outer casing 2 will be described.
Configuration Example of Electronic Pen Body Portion Unit 3

Figures 4A, 4B:
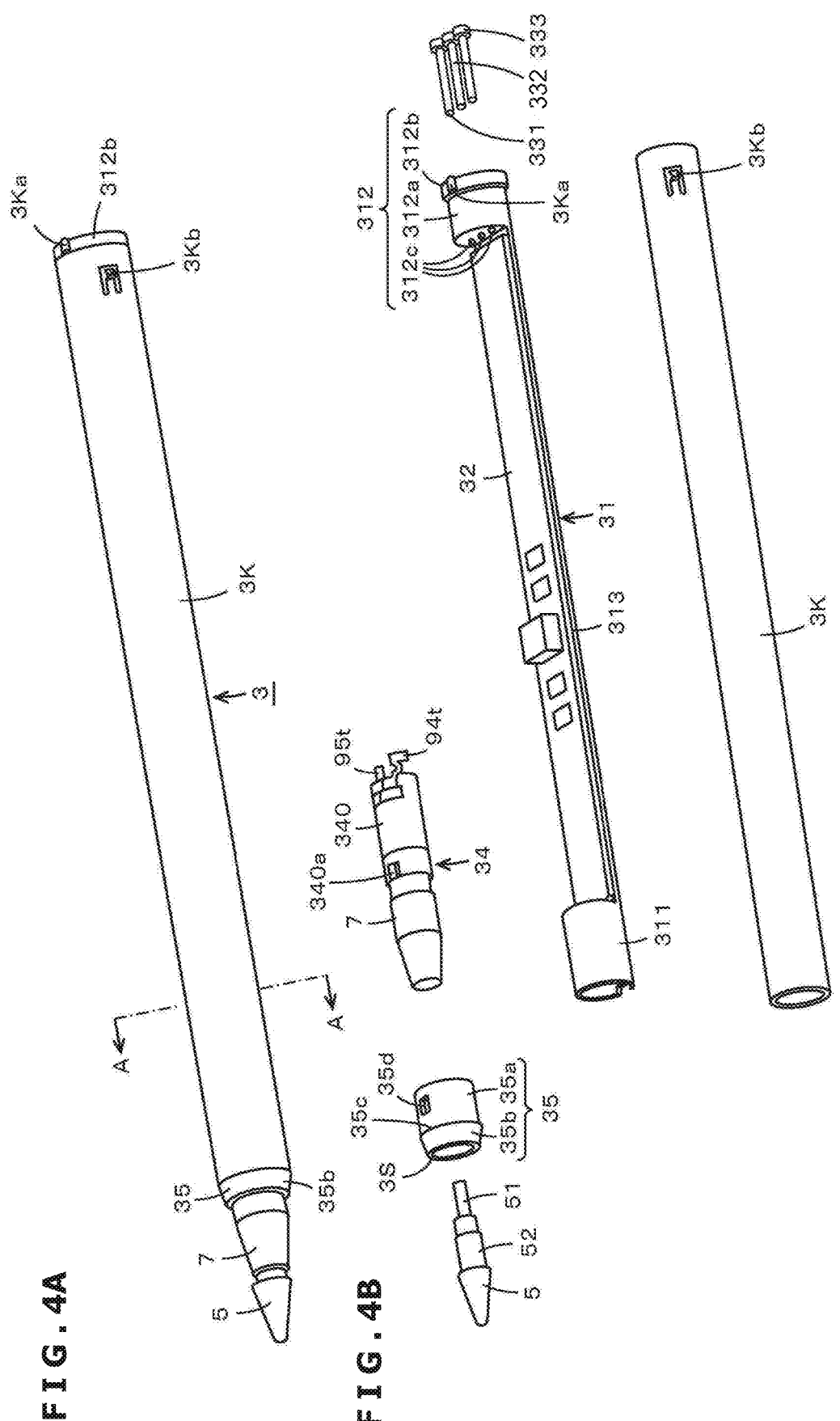
FIGS. 4A-4B depict exploded perspective views for describing a configuration example of an electronic pen body portion unit in the embodiment of the electronic pen according to the disclosure.
Figures 5A, 5B:
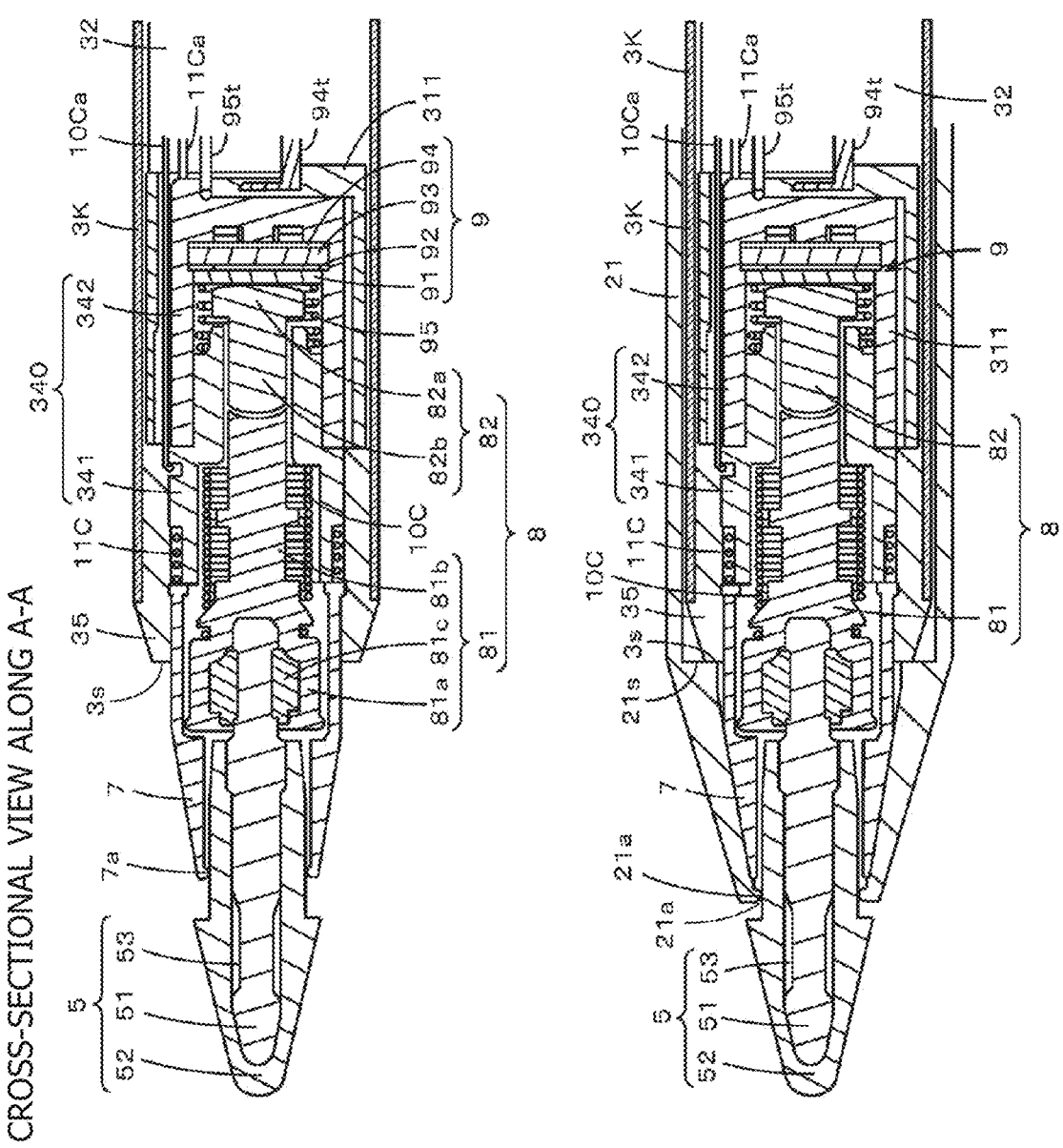
FIGS. 5A-5B depict cross-sectional views for describing a configuration of a pen tip side of the electronic pen body portion unit in the example of FIGS. 4A-4B.

FIG. 4 depicts diagrams for describing the electronic pen body portion unit 3 in the electronic pen 1 of the embodiment. FIG. 4A illustrates an appearance and corresponds to an enlargement of the electronic pen body portion unit 3 illustrated in FIG. 1B and FIG. 2B. In addition, FIG. 4B is an exploded perspective view of the electronic pen body portion unit 3. In addition, FIG. 5A is a cross-sectional view of a section on the core body 5 side in which the electronic pen body portion unit 3 is cut along line A-A in FIG. 4A.

In the embodiment, the electronic pen body portion unit 3 includes the unit housing 3K, a board holder 31, a circuit board 32 held in the board holder 31, three contact pins 331, 332, and 333 in the example, a pen tip side configuration portion 34, a pen tip side cap member 35, and the core body 5. The contact pins 331, 332, and 333 contain conductive metal. The core body 5 can be attached to and detached from the pen tip side configuration portion 34 of the electronic pen body portion unit 3.

The unit housing 3K includes a metal pipe containing SUS as an example of the conductive metal as described above. The unit housing 3K includes a columnar hollow space having an outer diameter allowing the housing of the unit housing 3K in the electronic pen outer casing 2 and having a predetermined inner diameter. Two elastic protrusions 3Kb are provided on the side surface of the unit housing 3K on the back end side at positions with an interval of 180 degrees in the example as described above, such that parts of the two elastic protrusions 3Kb protrude from the circumferential side surface of the unit housing 3K.

The board holder 31 has a boat-like shape allowing the housing of the board holder 31 in the hollow space of the unit housing 3K, and the length of the board holder 31 in the longitudinal direction corresponding to the axial direction of the unit housing 3K is slightly shorter than the length of the unit housing 3K in the axial direction. In addition, a pen tip side configuration portion holding portion 311 is provided on the pen tip side of the board holder 31 in the longitudinal direction. A terminal portion 312 is provided on the back end side, and a board mount portion 313 is formed on the middle part.

The pen tip side configuration portion holding portion 311 is formed in a cylindrical shape, and the back end side of the pen tip side configuration portion 34 is fitted and held in an internal hollow space of the section formed in the cylindrical shape as described later.

In addition, the terminal portion 312 on the back end side includes a columnar shape portion 312a with the outer diameter equal to or slightly smaller than the inner diameter of the unit housing 3K, and a flange projection portion 312b formed in a ring shape so as to protrude in the direction orthogonal to the axial direction from the side circumferential surface of the columnar shape portion 312a at the end portion of the columnar shape portion 312a on the back end side. The height of the flange projection portion 312*b* in the protrusion direction is equal to the thickness of the unit housing 3K. Therefore, when the board holder 31 is housed in the unit housing 3K, the back end side of the unit housing 3K is blocked by the columnar shape portion 312*a* of the terminal portion 312 of the board holder 31, and the flange projection portion 312*b* is engaged with the back end side of the unit housing 3K and exposed outside. Furthermore, the positioning projection portion 3Ka is formed at a predetermined angular position on the circumference of the flange projection portion 312*b*.

The board mount portion 313 includes a board mount surface obtained by cutting out a semicircle or more of a columnar section between the pen tip side configuration portion holding portion 311 and the terminal portion 312 on the back end side and forming the cut surface into a planar shape. The circuit board 32 is mounted and held on the board mount surface of the board mount portion 313.

The circuit board 32 has an elongated rectangular plate shape in the example, and a signal generation circuit described later and other electronic parts are provided on the board surface of the circuit board 32. Furthermore, conductive patterns for electrically connecting electrical constituent parts of the pen tip side configuration portion 34 and the contact pins 331, 332, and 333 provided on the terminal portion 312 described below to the electronic parts on the board surface are formed on the circuit board 32 although not illustrated.

Furthermore, in the example, three pin holes 312*c* for the three contact pins 331, 332, and 333 to penetrate in the axial direction, respectively, are formed on the columnar shape portion 312*a* of the terminal portion 312 on the back end side. In the example, the three pin holes 312*c* pass through the center of the circular end surface of the columnar shape portion 312*a* of the terminal portion 312 and are lined up and formed at equal intervals in the direction of a line parallel to the board mount surface of the board mount portion 313. In the example, the center pin hole of the three pin holes 312*c* is formed at the center position of the circular end surface of the columnar shape portion 312*a*. Note that the positioning projection portion 3Ka in the example is positioned on a line orthogonal to the line of the three pin holes 312*c* and passing through the position of the center pin hole of the three pin holes 312*c*.

The three contact pins 331, 332, and 333 are longer than the length of the columnar shape portion 312*a* of the terminal portion 312 in the axial direction. The three contact pins 331, 332, and 333 penetrate the three pin holes 312*c* of the terminal portion 312, and the front end portions of the three contact pins 331, 332, and 333 are exposed to the circuit board 32. Furthermore, the front end portions of the three contact pins 331, 332, and 333 exposed to the circuit board 32 are connected to the predetermined conductive patterns of the circuit board 32, respectively.

In addition, the head portions of the three contact pins 331, 332, and 333 are exposed outside at the circular end surface on the flange projection portion 312*b* side of the columnar shape portion 312*a* of the terminal portion 312 when the head portions are installed through the three pin holes 312*c* of the terminal portion 312. In this case, although the center contact pin 332 of the three contact pins 331, 332, and 333 is commonly used for connection in the power supply portion unit 4S and the power supply portion unit 4D in the embodiment as described later, the two contact pins 331 and 332 on both sides are only used for connection to the power supply portion unit 4S. In the embodiment, the head portion of the center contact pin 332 of the three contact pins 331, 332, and 333 protrudes in the axial direction with respect to the head portions of the other contact pins 331 and 333 as described later.

As illustrated in FIG. 4 and FIG. 5, the peripheral electrode 7 is attached to the pen tip side configuration portion 34, on the pen tip side of a pen pressure detection portion holder portion 340 in the example. The pen pressure detection portion holder portion 340 includes a pen pressure detection portion 9 and a pen pressure transmission member 8 in a cylindrical holder as illustrated in FIG. 5. The outer diameter of the cylindrical holder of the pen pressure detection portion holder portion 340 is slightly smaller than the inner diameter of the pen tip side configuration portion holding portion 311 of the board holder 31.

The peripheral electrode 7 is formed in a tubular shape by using a conductive material, such as conductive metal. As described later, the peripheral electrode 7 is arranged to surround the core body 5 including a conductive center electrode, and in the example, the peripheral electrode 7 plays a role of an electrode that receives a signal from the position detection sensor side. In the example, the peripheral electrode 7 has a tapered shape becoming narrower toward the pen tip, and the maximum value of the outer diameter of the peripheral electrode 7 is slightly smaller than the inner diameter of the pen tip side configuration portion holding portion 311 of the board holder 31.

An electrical connection terminal of the pen pressure detection portion 9 described later as well as a terminal electrically connected to the peripheral electrode 7 and a terminal electrically connected to the conductor portion (center electrode) of the core body 5 are drawn out from the back end side end surface of the pen tip side configuration portion 34.

A section of the pen tip side configuration portion 34 on the back end side of the pen pressure detection portion holder portion 340 is housed in the pen tip side configuration portion holding portion 311 of the board holder 31, and the electrical connection terminal of the pen pressure detection portion 9, the terminal electrically connected to the peripheral electrode 7, and the terminal electrically connected to the conductor portion of the core body 5 are electrically connected to predetermined conductor patterns of the circuit board 32.

In the board holder 31, the circuit board 32 provided with predetermined electronic parts is mounted and held on the board mount surface of the board mount portion 313, and the contact pins 331, 332, and 333 of the terminal portion 312 are electrically connected to the conductive patterns of the circuit board 32. Furthermore, the terminals of the pen tip side configuration portion 34 housed in the pen tip side configuration portion holding portion 311 are electrically connected to the conductive patterns of the circuit board 32, and then the board holder 31 is inserted into the hollow portion of the unit housing 3K from the back end side of the unit housing 3K.

In addition, the board holder 31 is inserted into the unit housing 3K until the flange projection portion 312*b* of the terminal portion 312 and the back end side ring-shaped end surface of the unit housing 3K collide with each other. The metallic unit housing 3K is then crimped at the section corresponding to the columnar shape portion 312*a* of the terminal portion 312 of the board holder 31 to fix the board holder 31 in the unit housing 3K.

In this case, as described above, the opening of the unit housing 3K on the back end side is blocked by the section of the board holder 31 where the flange projection portion 312*b* of the terminal portion 312 is formed, and the head portions of the three contact pins are exposed outside at the end surface of the section where the flange projection portion 312*b* of the terminal portion 312 is formed. In addition, the section near the coupling portion of the peripheral electrode 7 of the pen tip side configuration portion 34 and the peripheral electrode 7 of the pen pressure detection portion holder portion 340 protrudes outside from the opening of the unit housing 3K on the pen tip side (see FIG. 4A).

The pen tip side cap member 35 in the example contains an insulating material that is an elastic material, such as non-conductive rubber. The pen tip side cap member 35 includes a tubular shape portion 35*a*, in which the inner diameter is equal to the maximum outer diameter of the peripheral electrode 7 or slightly larger than the maximum outer diameter of the peripheral electrode 7, and the inner diameter is also equal to or slightly smaller than the inner diameter of the hollow portion of the unit housing 3K, and a front end flange portion 35*b* including an outer diameter section larger than the outer diameter of the tubular shape portion 35*a* on the pen tip side of the tubular shape portion 35*a*. In this case, the maximum outer diameter of the front end flange portion 35*b* in the example is larger than the diameter of the tubular shape portion 35*a* by the amount of the thickness of the unit housing 3K. Therefore, a step portion 35*c* is formed at the boundary section of the tubular shape portion 35*a* and the front end flange portion 35*b* as illustrated in FIG. 4B.

In the pen tip side cap member 35, the tubular shape portion 35*a* is inserted into the unit housing 3K from the pen tip side such that the tubular shape portion 35*a* covers the connection portion of the peripheral electrode 7 protruding from the pen tip side of the unit housing 3K and the pen pressure detection portion holder portion 340. In this case, when the pen tip side cap member 35 is inserted into the unit housing 3K toward the pen tip until the step portion 35*c* of the pen tip side cap member 35 and the ring-shaped end surface of the pen tip side opening of the unit housing 3K collide with each other, a protrusion provided on the pen pressure detection portion holder portion 340 is fitted to a recess hole 35*d* drilled on the tubular shape portion 35*a*, and the pen tip side cap member 35 is locked to the unit housing 3K.

In this way, as illustrated in FIG. 4A, the pen tip side cap member 35 locks the pen tip side configuration portion 34 in the unit housing 3K in the state in which the tapered section of the peripheral electrode 7 on the pen tip side protrudes outside from the opening of the unit housing 3K on the pen tip side. In this state, the metallic unit housing 3K can be crimped at the section corresponding to the tubular shape portion 35*a* of the pen tip side cap member 35 to house and fix, in the unit housing 3K, the functional portion of the electronic pen body portion including the board holder 31 and the pen tip side configuration portion 34. Furthermore, the core body 5 can be inserted inside from the opening of the peripheral electrode 7 on the pen tip side, and the core body 5 can be locked to the pen tip side configuration portion 34 to form the electronic pen body portion unit 3 illustrated in FIG. 4A.

Note that as illustrated in FIGS. 1B, 1C, 2B, 2C, 3, 4A, and 4B, the end surface of the pen tip side cap member 35 on the pen tip side includes a stepped portion with respect to the circumferential side surface of the peripheral electrode 7, and the stepped portion forms the step portion 3*s* with respect to the peripheral electrode 7 protruding from the pen tip side of the unit housing 3K.

Detailed Configuration Example of Pen Tip Side of Electronic Pen Body Portion Unit 3

Next, the configuration example of the pen tip side in the electronic pen body portion unit 3 will be further described with reference to FIG. 5A that is a cross-sectional view along line A-A in FIG. 4A.

The pen tip side configuration portion 34 is provided by linking the peripheral electrode 7 and the pen pressure detection portion holder portion 340 as illustrated in FIG. 4B, and the pen pressure detection portion holder portion 340 is formed by linking a pipe-shaped holding member 341 and a cup-shaped pen pressure detection portion holding member 342 as illustrated in FIG. 5A. Furthermore, the core body 5, the pen pressure transmission member 8, and the pen pressure detection portion 9 with the same center axis positions are lined up and provided in series in the axial direction in a communication space in the peripheral electrode 7 and the pen pressure detection portion holder portion 340.

The core body 5 is formed by using a protection member 52 formed by a non-conductive material to cover most of a center electrode 51 formed by a conductive material in the example excluding the back end side as illustrated in FIG. 5A. In the case of the example, the core body 5 has a structure provided with a space (air layer) 53 between the center electrode 51 and the protection member 52 as illustrated in FIG. 5A.

A signal (electric field) emitted from a section on the front end side of a wide section of an oval pen tip portion of the center electrode 51 of the core body 5 is relatively efficiently emitted through only the protection member 52. However, emission of the signal (electric field) from a thin section on the back end side of the oval pen tip portion of the center electrode 51 is suppressed by the action of the space 53 and the protection member 52. The space 53 and the protection member 52 have different dielectric constants, and this is because this section functions like two layers of capacitors. In this way, even if the electronic pen 1 is tilted with respect to the input surface of the position detection sensor, a favorable signal that is not unnecessarily broad can be transmitted from the center electrode 51.

The peripheral electrode 7 is attached by covering the connection portion of the peripheral electrode 7 and the pipe-shaped holding member 341 by the pen tip side cap member 35 at the pen tip side of the pipe-shaped holding member 341 of the pen pressure detection portion holder portion 340. The front end surface of the pipe-shaped holding member 341 collides with the back end surface of the peripheral electrode 7 as illustrated in FIG. 5A.

Furthermore, as illustrated in FIG. 5A, a coil spring 11C for peripheral electrode containing a conductive material, which is conductive metal in the example, is provided on the side surface of the pipe-shaped holding member 341 on the pen tip side. One end portion of the coil spring 11C is connected to the peripheral electrode 7. In addition, the other end portion of the coil spring 11C is an end portion 11Ca of an extension line (conductor line) extended from the coil spring 11C in FIG. 5A, and the end portion 11Ca is drawn out to the circuit board 32 and connected to the predetermined conductor patterns of the circuit board 32.

Note that, in the embodiment, the unit housing 3K containing conductive metal of the electronic pen body portion unit 3 is connected to an earth conductor of the circuit board 32.

The pen pressure transmission member 8 includes two separated individual members including a core body holding member 81 positioned on the pen tip side and a pressing member 82. In the embodiment, the core body holding member 81 and the pressing member 82 are formed by, for example, a hard resin that is a non-conductive material. The core body holding member 81 includes a cup-shaped holding portion 81a including a recess portion, and an extension portion 81b extended from the back end of the holding portion 81a to the back end side in the opposite direction of the pen tip. The recess portion of the holding portion 81a is provided with a conductive ring-shaped elastic member 81c, such as conductive rubber.

In this way, as illustrated in FIG. 5A, when the section where the center electrode 51 on the back end side of the core body 5 is exposed is placed into the recess portion of the holding portion 81a of the core body holding member 81, the elastic member 81c tightens around the section where the center electrode 51 is exposed, and the core body 5 is held by the core body holding member 81. In the state in which the core body 5 is held by the core body holding member 81, the core body 5 can be removed from the core body holding member 81 by, for example, hooking a fingernail onto the pen tip section to pick and pull out the pen tip section.

Furthermore, in the state in which the core body 5 is inserted into the pen tip side configuration portion 34 in the embodiment, a front end portion 7a on the pen tip side of the peripheral electrode 7 is abutted to the side circumferential surface of the protection member 52 at the small diameter section on the back side of the tapered front end portion of the core body 5 to restrict the core body 5 from moving in the direction orthogonal to the axial direction at the abutted section as illustrated in FIG. 5A. For this configuration, the front end portion 7a on the pen tip side of the peripheral electrode 7 protrudes so as to project inward as illustrated in FIG. 5A, and the size of the opening portion on the pen tip side of the peripheral electrode 7 is set to a value substantially equal to or slightly larger than the diameter of the abutted section of the core body 5. In this way, the core body 5 is installed on the pen tip side configuration portion 34 without rattling at the pen tip side opening portion of the peripheral electrode 7.

To restrict the core body 5 from moving in the direction orthogonal to the axial direction near the pen tip side opening portion of the electronic pen 1, the configuration of a front end portion on the pen tip side of the electronic pen outer casing 2 of the electronic pen 1, which is a front end portion 21c on the pen tip side of the pen tip side housing portion 21 in the case of the embodiment, may be similar to the configuration of the front end portion 7a on the pen tip side of the peripheral electrode 7 as illustrated in FIG. 5B, instead of using the front end portion 7a on the pen tip side of the peripheral electrode 7 to abut and support the core body 5 as in the embodiment.

That is, the front end portion on the pen tip side of the peripheral electrode 7 is larger than the diameter of the section facing it when the core body 5 is installed as illustrated in FIG. 5B, and the front end portion 21c on the pen tip side of the electronic pen outer casing 2 protrudes so as to project inward as illustrated in FIG. 5B. The size of the opening 21a on the pen tip side of the pen tip side housing portion 21 is set to a value substantially equal to or slightly larger than the abutted section of the core body 5. In this way, the core body 5 is installed on the electronic pen 1 without rattling at the pen tip side opening 21a of the pen tip side housing portion 21.

Note that when the front end portion of the electronic pen outer casing 2 on the pen tip side is used to restrict the core body 5 from moving in the direction orthogonal to the axial direction near the pen tip side opening portion of the electronic pen 1 as in FIG. 5B, the pen tip side of the electronic pen outer casing 2 needs to be precisely formed according to the configuration of the core body 5. Therefore, it is difficult to manufacture the electronic pen outer casing 2 completely separately from the electronic pen body portion unit 3 and the core body 5, and this limits the degree of freedom of design or configuration of the electronic pen outer casing 2.

In this regard, when the front end portion 7a on the pen tip side of the peripheral electrode 7 of the electronic pen body portion unit 3 is formed as described above as in the embodiment, it is only necessary to simply form the opening portion on the pen tip side such that the electronic pen body portion unit 3 can be housed and at least the front end portion of the core body 5 installed on the pen tip side of the electronic pen body portion unit 3 can protrude outside as also illustrated in FIGS. 3A, 3B, and 3C. This increases the degree of freedom of design of the electronic pen outer casing 2, and there is an advantageous effect that the electronic pen outer casing 2 can be manufactured completely separately from the electronic pen body portion unit 3 and the core body 5.

A core body coil spring 10C containing a conductive material, which is conductive metal in the example, is provided around the extension portion 81b of the core body holding member 81 of the pen pressure transmission member 8 as illustrated in FIG. 5A. The extension portion 81b of the core body holding member 81 penetrates the center section of the core body coil spring 10C. In this case, one turn (one roll) of the core body coil spring 10C on the holding portion 81a side of the core body holding member 81 is fitted to a recess portion provided on the side surface between the holding portion 81a and the extension portion 81b of the core body holding member 81, and the core body coil spring 10C holds the core body holding member 81. However, the core body coil spring 10C prevents the core body holding member 81 from being biased in the axial direction. That is, the core body holding member 81 is hung down from the core body coil spring 10C and held in the pen tip side configuration portion 34.

Furthermore, one end portion of the core body coil spring 10C on the pen tip side is connected to the conductive elastic member 81c provided on the holding portion 81a of the core body holding member 81. In addition, another end portion 10Ca on the back end side is extended to the circuit board 32 and connected to a signal transmission circuit of the circuit board 32 as illustrated in FIG. 5A. In this way, a signal from the signal transmission circuit of the circuit board 32 is supplied to the center electrode 51 of the core body 5 through the core body coil spring 10C and the elastic member 81c, and the signal is transmitted from the center electrode 51 toward the position detection sensor.

The pressing member 82 in the example included in the pen pressure transmission member 8 has a mushroom shape including a press head portion 82a on the pen pressure detection portion 9 side, and a stem-shaped portion 82b with the diameter shorter than the diameter of the press head portion 82a, the stem-shaped portion 82b being coupled to the core body holding member 81. The end surface of the press head portion 82a on the pen pressure detection portion 9 side is a projection curved surface, with the center being the vertex.

Furthermore, in the embodiment, the end surface of the pressing member 82 on the side coupled to the core body holding member 81 is also a projection curved surface with the center being the vertex, as with the end surface of the press head portion 82a. On the other hand, the end surface of the core body holding member 81 on the side coupled to the pressing member 82 is a recess curved surface corresponding to the projection curved surface of the pressing member 82 in the example. In this way, when the direction of the pen pressure applied to the front end of the core body 5 is a diagonal direction shifted from the axial direction of the electronic pen outer casing 2, the recess curved surface side of the core body holding member 81 can be displaced from the projection curved surface of the pressing member 82 such that the axial direction of the core body 5 and the core body holding member 81 is shifted from the axial direction of the electronic pen outer casing 2. Note that the actual amount of displacement of the recess curved surface side of the core body holding member 81 is small. Furthermore, in the embodiment, the axial direction of the pressing member 82 continues to coincide with the axial direction of the electronic pen outer casing 2 even when the side of the extension portion 81*b* of the core body holding member 81 coupled to the pressing member 82 is displaced.

The pen pressure detection portion 9 in the example is a variable capacitor, in which a circular flat first electrode 91 faces one surface of a circular flat dielectric 93 through a ring-shaped spacer 92, and a metallic circular second electrode 94 is pasted on the other surface of the dielectric 93 as illustrated in FIG. 5A. The first electrode 91 is formed by a conductive elastic material, such as conductive rubber.

Furthermore, as illustrated in FIG. 5A, one end of a first electrode coil spring 95 formed by a conductive material, such as conductive metal, is in contact with the first electrode 91 of the pen pressure detection portion 9, and another end 95*t* of the first electrode coil spring 95 is drawn out to the circuit board 32. In addition, a terminal piece 94*t* connected to the second electrode 94 is drawn out to the circuit board 32. The other end 95*t* of the first electrode coil spring 95 and the terminal piece 94*t* connected to the second electrode 94 are connected to the predetermined conductor patterns on the circuit board 32.

When the pen pressure is applied to the core body 5 with the front end portion protruding from the opening of the electronic pen outer casing 2 of the electronic pen 1, the pen pressure is transmitted to the pen pressure detection portion 9 through the core body holding member 81 and the pressing member 82 of the pen pressure transmission member 8. That is, when the pen pressure is applied to the core body 5, the pressing member 82 of the pen pressure transmission member 8 presses the first electrode 91 of the pen pressure detection portion 9, and the first electrode 91 approaches and comes into contact with the dielectric 93 through the ring-shaped spacer 92. The contact area of the first electrode 91 and the dielectric 93 in this case varies according to the pen pressure applied to the core body 5. Therefore, the capacitance of the variable capacitor including the first electrode 91 and the second electrode 94 facing each other through the dielectric 93 varies according to the pen pressure applied to the core body 5. In this way, the pen pressure detection portion 9 detects the pen pressure applied to the core body 5 in real time based on the change in the capacitance. When there is no more pen pressure applied to the core body 5, the first electrode 91 pushes back the pen pressure transmission member 8 and the core body 5, and the pen pressure transmission member 8 and the core body 5 return to the original positions.

In this case, the pen pressure transmission member 8 in the embodiment is separated into the core body holding member 81 and the pressing member 82, and the core body holding member 81 is coupled to the pressing member 82 such that the core body holding member 81 can be displaced from the pressing member 82 in the direction crossing the axial direction on the side coupled to the pressing member 82. Therefore, the pen pressure detection portion 9 can more appropriately detect the pen pressure compared to when the pen pressure transmission member 8 is provided as one part.

For example, if the pen pressure is applied to the core body 5 in the direction coinciding with the axial direction of the core body 5, the projection curved surface of the pen pressure transmission member 8 comes into contact in a circular region around the substantially center position of the first electrode 91 of the pen pressure detection portion 9 as indicated by oblique lines in FIG. 6A when the pen pressure transmission member is provided as one part and also when the pen pressure transmission member 8 is separated into the core body holding member 81 and the pressing member 82 as in the embodiment. Therefore, the pen pressure detection portion 9 can appropriately detect the pen pressure applied to the core body 5 through the pen pressure transmission member 8.

On the other hand, if the pen pressure is applied to the core body 5 in a direction crossing the axial direction of the core body 5 such as when the electronic pen 1 in a tilted state comes into contact with the input surface of the position detection sensor, the core body 5 and the pen pressure transmission member are displaced such that the axial direction of the core body 5 and the pen pressure transmission member is shifted and tilted from the axial direction of the electronic pen outer casing 2 due to the pen pressure applied to the core body 5 when the pen pressure transmission member is provided as one part. Therefore, the contact position of the end portion of the pen pressure transmission member and the first electrode 91 of the pen pressure detection portion 9 is a region shifted from the center position of the first electrode 91 of the pen pressure detection portion 9 in the direction opposite the direction of the application of the pen pressure as indicated by oblique lines in FIG. 6B. As a result, the pen pressure detection portion 9 may not appropriately detect the pen pressure applied to the core body 5.

On the other hand, the pen pressure transmission member 8 of the electronic pen body portion unit 3 of the electronic pen 1 of the embodiment is separated into the core body holding member 81 and the pressing member 82, and at the coupling portion of the core body holding member 81 and the pressing member 82, the core body holding member 81 in the example is brought into contact and coupled to the pressing member 82 at the curved surface so that the core body holding member 81 can move in the direction crossing the axial direction with respect to the pressing member 82.

Therefore, in the state in which the pen pressure is applied to the core body 5 in the direction crossing the axial direction of the core body 5, only the core body holding member 81 is displaced so that the axial direction of the core body holding member 81 is shifted and tilted from the axial direction of the electronic pen outer casing 2 due to the pen pressure applied to the core body 5. The axial direction of the pressing member 82 continues to coincide with the axial direction of the electronic pen outer casing 2, and the pressing member 82 receives the pen pressure applied to the core body 5 through the core body holding member 81 and comes into contact with and presses the first electrode 91 of the pen pressure detection portion 9. That is, even when the pen pressure is applied to the core body 5 in the direction crossing the axial direction of the core body 5, the pressing member 82 maintains the state in which the pressing member 82 comes into contact in the circular region around the substantially center position of the first electrode 91 of the pen pressure detection portion 9 illustrated in FIG. 6A. In this way, the pen pressure detection portion 9 can appropriately detect the pen pressure applied to the core body 5 through the pen pressure transmission member 8.

In addition, as described above, the core body 5 in the embodiment is restricted by the front end portion 7*a* of the peripheral electrode 7 at the small diameter section on the back side of the tapered front end portion protruding outside from the opening at the front end of the peripheral electrode 7 such that the core body 5 does not move in the direction orthogonal to the axial direction as illustrated in FIG. 5A. Therefore, when the pen pressure is applied to the core body 5 in the direction crossing the axial direction of the core body 5, the core body 5 and the core body holding member 81 are tilted and displaced, with the position supported by the front end portion 7*a* of the peripheral electrode 7 being the fulcrum position.

Therefore, the tilt and the displacement of the core body 5 and the core body holding member 81 are smaller than when the core body 5 is not restricted and supported by the front end portion 7*a* of the peripheral electrode 7. This reduces the displacement of the contact position of the pressing member 82 and the first electrode 91 of the pen pressure detection portion 9 from the circular region around the substantially center position of the first electrode 91 of the pen pressure detection portion 9. As a result, the possibility that the pen pressure detection portion 9 cannot appropriately detect the pen pressure applied to the core body 5 can be reduced.

Note that the advantageous effect can also be similarly obtained when the core body 5 is restricted and supported by the opening section on the pen tip side of the electronic pen outer casing as illustrated in FIG. 5B, instead of the front end portion 7*a* of the peripheral electrode 7. In addition, when the pen pressure transmission member 8 is formed as one part without separating the pen pressure transmission member 8 into the core body holding member 81 and the pressing member 82, the advantageous effect of reducing the displacement of the contact position of the pressing member 82 and the first electrode 91 of the pen pressure detection portion 9 from the circular region around the substantially center position of the first electrode 91 of the pen pressure detection portion 9 can be obtained, and the possibility that the pen pressure detection portion 9 cannot appropriately detect the pen pressure applied to the core body 5 can be reduced.

As described above, the pen pressure transmission member 8 is separated into the core body holding member 81 and the pressing member 82, and the core body holding member 81 can move in the direction crossing the axial direction with respect to the pressing member 82 in the embodiment. Furthermore, the core body 5 is abutted and supported at the middle of the core body 5 in the axial direction so that the core body 5 does not move in the direction crossing the axial direction. As a result, there is an advantageous effect that the pen pressure detection portion 9 can appropriately detect the pen pressure applied to the core body 5 even when the application direction of the pen pressure to the core body 5 is a diagonal direction shifted from the axial direction.

Modification of Coupling Section of Core Body Holding Member 81 and Pressing Member 82 of Pen Pressure Transmission Member 8

In the coupling portion of the core body holding member 81 and the pressing member 82 of the pen pressure transmission member 8 in the embodiment, the back end side end surface of the extension portion 81*b* of the core body holding member 81 is a recess curved surface, and the pen tip side end surface of the stem-shaped portion 82*b* of the pressing member 82 is a projection curved surface. However, the shapes of the back end surface of the extension portion 81*b* of the core body holding member 81 and the pen tip side end surface of the stem-shaped portion 82*b* of the pressing member 82 are not limited to these. Hereinafter, some modifications of the shapes will be described with reference to FIG. 7 and FIG. 8.

In a pen pressure transmission member 8A of an example of FIG. 7A, the back end side end surface of an extension portion 81*b*A of a core body holding member 81A is a projection curved surface, and the pen tip side end surface of a stem-shaped portion 82*b*A of a pressing member 82A is a recess curved surface.

Furthermore, in a pen pressure transmission member 8B of an example of FIG. 7B, not the entire end surface of the back end side end surface of an extension portion 81*b*B of a core body holding member 81B is a recess curved surface, but only the center section of a predetermined radius from the center of the circular end surface is a recess curved surface 81*b*Bx. A planar edge portion 81*b*Bf is provided around the recess curved surface 81*b*Bx. On the other hand, the pen tip side end surface of a pressing member 82B is a projection curved surface 82*b*Bx corresponding to the recess curved surface 81*b*Bx on the back end side end surface of the core body holding member 81B.

Furthermore, in a pen pressure transmission member 8C of an example illustrated in FIG. 7C, not the entire end surface of the pen tip side end surface of a pressing member 82C is a recess curved surface, but only the center section of a predetermined radius from the center of the circular end surface is a recess curved surface 82*b*Cx, contrary to the pen pressure transmission member 8B in the example of FIG. 7B. A planar edge portion 82*b*Cf is provided around the recess curved surface 82*b*Cx, and the back end side end surface of an extension portion 81*b*C of a core body holding member 81C is a projection curved surface 81*b*Cx corresponding to a recess curved surface 81*b*Dx on the pen tip side end surface of the pressing member 82C.

Note that, in the case of the pen pressure transmission member 8B of the example illustrated in FIG. 7B, the degrees of the radius and the protrusion of the projection curved surface 82*b*Bx of the stem-shaped portion 82*b*B, the degrees of the radius of curvature and the depth of the recess curved surface 81*b*Bx of the extension portion 81*b*B, and the like can be appropriately set according to the size and the like of the electronic pen 1. Similarly, in the case of the pen pressure transmission member 8C of the example illustrated in FIG. 7C, the degrees of the radius and the protrusion of the projection curved surface 82*b*Cx of the extension portion 81*b*C, the degrees of the radius and the depth of the recess curved surface of the recess curved surface 82*b*Cx of the stem-shaped portion 82*b*E, and the like can be appropriately set according to the size and the like of the electronic pen 1.

Furthermore, in each of the cases of the pen pressure transmission members in the modifications and the embodiment, the back end side end surface of the core body holding member and the pen tip side end surface of the pressing member are a recess curved surface and a projection curved surface. However, the bottom surface section of the recess curved surface may be flat, and the vertex section of the projection curved surface may be flat. In short, it is only necessary that the recess curved surface and the projection curved surface facing each other function as a generally-called universal joint, so that the pen pressure in the axial direction can be appropriately transmitted to the pen pressure detection portion 9 even when the pressure is applied to the core body 5 in the direction crossing the axial direction.

In addition, the shapes of the back end surface of the extension portion 81*b* of the core body holding member 81 and the pen tip side end surface of the stem-shaped portion 82*b* of the pressing member 82 are not limited to the cases in which one of them is a projection curved surface, and the other is a recess curved surface as in the examples.

Figure 8A:
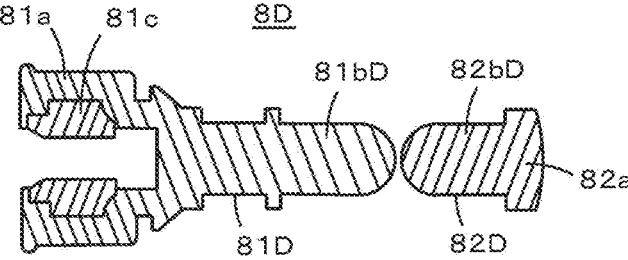
FIGS. 8A-8D depict diagrams used for describing the configuration of the pen tip side of the electronic pen body portion unit illustrated in FIGS. 5A-5B.

In a pen pressure transmission member 8D of an example of FIG. 8A, the back end side end surface of an extension portion 81bD of a core body holding member 81D is a projection curved surface, and the pen tip side end surface of a stem-shaped portion 82bD of a pressing member 82D is also a projection curved surface.

Figure 8B:
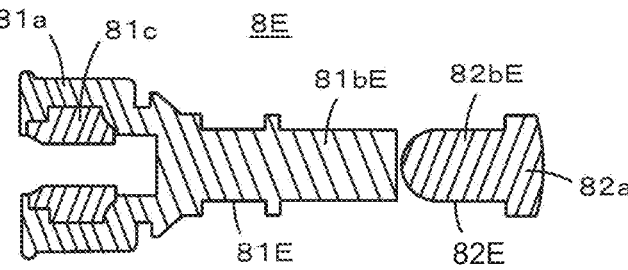
Figure 8C:
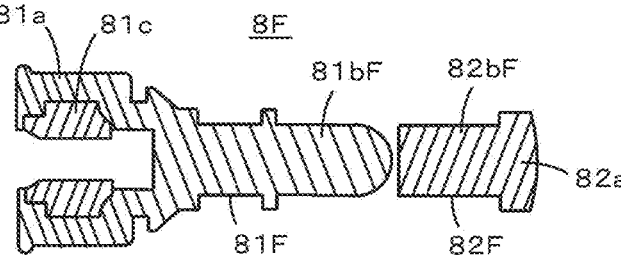
Figure 8D:
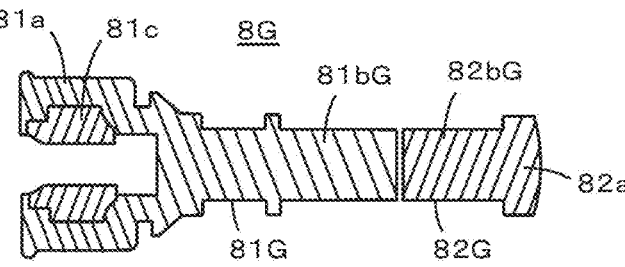

Furthermore, in a pen pressure transmission member 8E of an example of FIG. 8B, the back end side end surface of an extension portion 82bE of a core body holding member 81E is a flat surface, and the pen tip side end surface of a stem-shaped portion 82bE of a pressing member 82E is a projection curved surface. Conversely, in a pen pressure transmission member 8F of an example of FIG. 8C, the back end side end surface of an extension portion 81bF of a core body holding member 81F is a projection curved surface, and the pen tip side end surface of a stem-shaped portion 82bF of a pressing member 82F is a flat surface.

Furthermore, it is only necessary that the back end side end surface of the core body holding member can be slightly displaced from the pen tip side end surface of the pressing member in the direction crossing the axial direction. Therefore, as in a pen pressure transmission member 8G of an example of FIG. 8D, the back end side end surface of an extension portion 81bG of a core body holding member 81G may be a flat surface, and the pen tip side end surface of a stem-shaped portion 82bG of a pressing member 82G may also be a flat surface.

When the pen pressure transmission member of each example illustrated in FIG. 7 and FIG. 8 is used, the application of the pen pressure to the core body 5 in the diagonal direction crossing the axial direction does not significantly change the contact positions and the contact area of the pressing member and the first electrode of the pen pressure detection portion 9, and the pen pressure transmission member does not enter the state of FIG. 6B. Therefore, the pen pressure applied to the core body 5 can be appropriately transmitted to the pen pressure detection portion 9 through the pen pressure transmission member, and the pen pressure detection portion 9 can appropriately detect the pen pressure.

Configuration Examples of Power Supply Portion Unit

Configuration Example of Power Supply Portion Unit 4S

Figures 9A, 9B, 9C, 9D:
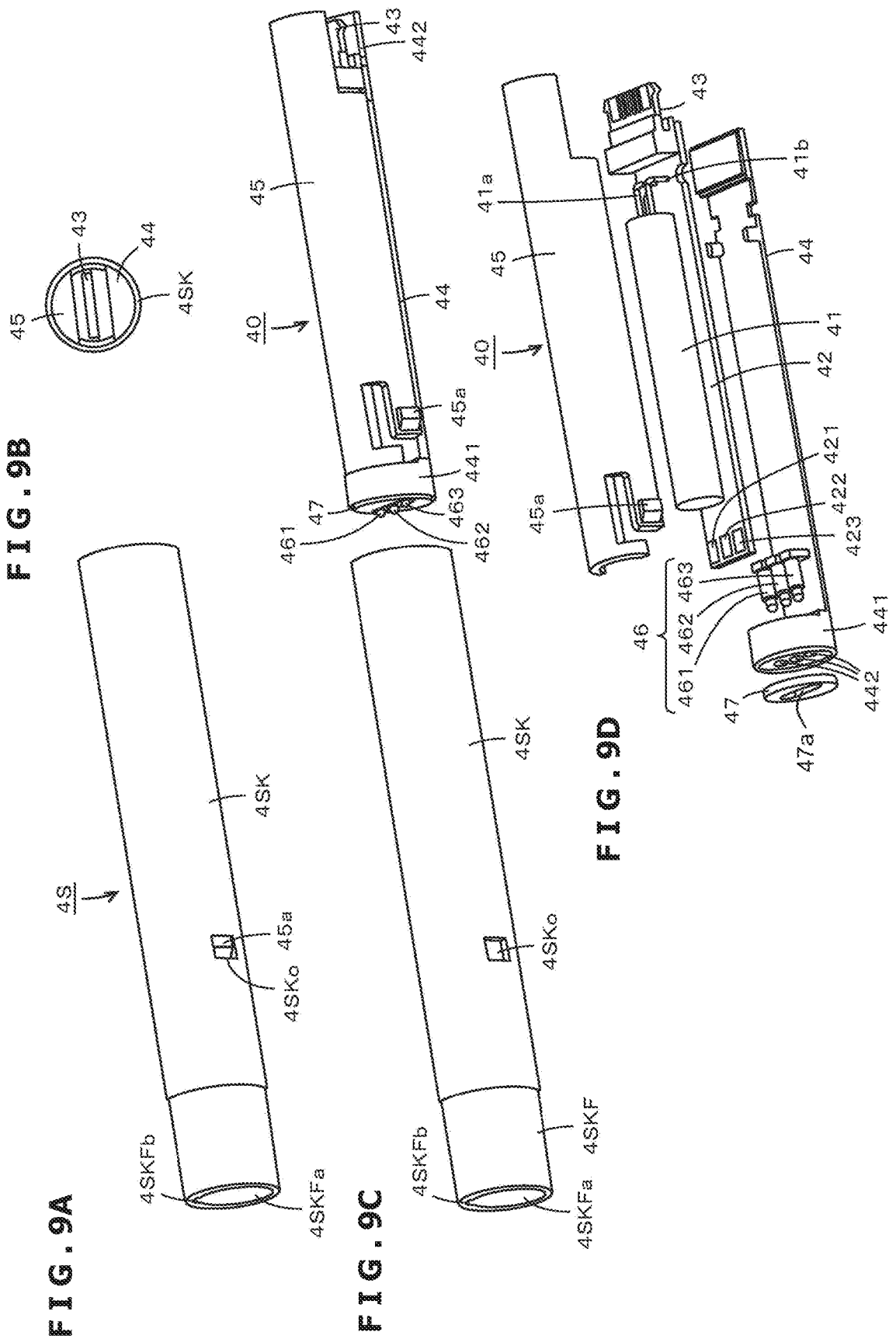
FIGS. 9A-9D depict exploded perspective views for describing a configuration example of a power supply portion unit in the case of using the secondary battery as a power supply in the embodiment of the electronic pen according to the disclosure.

FIG. 9 depicts diagrams for describing a configuration example of the power supply portion unit 4S. FIG. 9A is a diagram illustrating an appearance of the power supply portion unit 4S, and FIG. 9B is a diagram of the power supply portion unit 4S viewed from the back end side in the axial direction. In addition, FIG. 9C is a diagram for describing constituent parts of the power supply portion unit 4S, and the power supply portion unit 4S includes the unit housing 4SK in a tubular shape, which is a cylindrical shape in the example, and a secondary battery module 40 housed in the hollow portion of the unit housing 4SK.

The appearance of the secondary battery module 40 is columnar in the example, and the outer diameter of the columnar secondary battery module 40 is selected to be smaller than the inner diameter of the unit housing 4SK. In this way, the secondary battery module 40 is inserted and housed in the hollow portion of the unit housing 4SK. Note that, in the example, the length of the secondary battery module 40 in the axial direction is a length from the back end portion of the unit housing 4SK to the bottom of the recess portion 4SKFa of the fitting portion 4SKF.

FIG. 9D is an exploded configuration diagram of the secondary battery module 40. As illustrated in FIG. 9D, the secondary battery module 40 in the embodiment includes a secondary battery 41 including a lithium ion battery in the example, a circuit board 42, a type C USB (Universal Serial Bus) connector 43 as an example of a charging connector, a boat-like holder 44 containing a resin as an example of an insulating material, a holder cover 45 similarly containing a resin as an example of an insulating material, a plurality of, three in the example, connection pins 461, 462, and 463 for electrical connection to the electronic pen body portion unit 3, and an elastic rubber member 47 as an example of an elastic member for buffering.

In the example, the connection pin 461 is connected to a charging terminal of the USB connector 43. The connection pin 462 is connected to a positive electrode side terminal of the secondary battery 41. The connection pin 463 is connected to a negative electrode side terminal of the secondary battery 41. Furthermore, the connection pins 461, 462, and 463 include pogo pins in the example. Note that conductive patterns are formed in the circuit board 42 such that the connection pin 463 connected to the negative electrode side terminal of the secondary battery 41 is also connected to an earth terminal of the USB connector 43. In the following description, the connection pins 461, 462, and 463 will be referred to as pogo pins 461, 462, and 463.

A positive electrode terminal 41*a* and a negative electrode terminal 41*b* of the secondary battery 41 are inserted into a terminal hole drilled on the circuit board 42 and are soldered to the conductive patterns of the circuit board 42. In this way, the secondary battery 41 is fixed on the circuit board 42. In addition, the USB connector 43 is attached to the back end side of the circuit board 42 in the axial direction, and a charge terminal lead portion and an earth terminal lead portion of the USB connector 43 are soldered to the conductor patterns of the circuit board 42.

Furthermore, a conductor pattern 421 connected to the charging terminal of the USB connector 43, a conductor pattern 422 connected to the positive electrode side terminal of the secondary battery 41, and a conductor pattern 423 connected to the negative electrode side terminal of the secondary battery 41 and the earth terminal of the USB connector 43 are formed on the side of the circuit board 42 coupled to the electronic pen body portion unit 3. Furthermore, the pogo pins 461, 462, and 463 are electrically connected to the conductor patterns 421, 422, and 423 on the circuit board 42, respectively A terminal portion 441 is formed on the side of the holder 44 coupled to the electronic pen body portion unit 3, the terminal portion 441 including a columnar shape portion including a circular end surface facing the circular end surface of the columnar shape portion 312*a* of the terminal portion 312 on the back end side of the electronic pen body portion unit 3 when the holder 44 is coupled to the electronic pen body portion unit 3. Three through holes 442 for the three pogo pins 461, 462, and 463 of the connection pin portion 46 to go through and for head portions of the pogo pins 461, 462, and 463 to protrude are formed on the terminal portion 441 including the columnar shape portion. The three through holes 442 pass through the center of the circular end surface of the columnar shape portion of the terminal portion 441 such that the three through holes 442 correspond to the positions of the three contact pins 331, 332, and 333 in which the head portions are exposed from the circular end surface of the columnar shape portion 312*a* of the terminal portion 312 of the electronic pen body portion unit 3, and the three through holes 442 are lined up and formed at equal intervals in the direction of the line parallel to the board surface of the circuit board 42. In the example, the three pin holes 442 are formed such that the center pin hole of the three pin holes 442 is at the center position of the circular end surface of the columnar shape portion of the terminal portion 441.

Furthermore, as described above, the circuit board 42 on which the secondary battery 41 and the USB connector 43 are mounted and electrically connected is mounted and held by the holder 44, and the circuit board 42 is electrically connected to the three pogo pins 461, 462, and 463 penetrating and inserted into the three pin holes 442 of the columnar shape portion of the terminal portion 441. Furthermore, in the embodiment, the holder cover 45 is coupled to the holder 44 by bonding or the like such that the holder cover 45 covers the section of the holder 44 excluding the terminal portion 441. In the state in which the holder cover 45 is coupled to the holder 44, the columnar secondary battery module 40 is formed as illustrated on the right side of FIG. 9C.

Furthermore, in the embodiment, the circular thin-plate elastic rubber member 47 is installed by bonding or the like on the circular end surface of the columnar shape portion of the terminal portion 441 of the holder 44 of the secondary battery module 40. In the circular thin-plate elastic rubber member 47, the region including the three pin holes 442 on the circular end surface of the columnar shape portion of the terminal portion 441 of the holder 44 is an opening 47a as illustrated in FIG. 9D. The head portions of the three pogo pins 461, 462, and 463 penetrating the three through holes 442 to protrude are exposed outside through the opening 47a of the elastic rubber member 47 as illustrated on the right side of FIG. 9C, and the head portions of the pogo pins 461, 462, and 463 protrude with respect to the end surface of the elastic rubber member 47.

Furthermore, the secondary battery module 40 configured as described above is inserted into the hollow portion of the unit housing 4SK from the back end side of the unit housing 4SK in the state that the side in which the elastic rubber member 47 is installed on the front surface of the circular end surface of the columnar shape portion of the terminal portion 441 of the holder 44 is the fitting portion 4SKF side, and the power supply portion unit 4S illustrated in FIG. 9A is formed. In this case, the secondary battery module 40 is housed in the unit housing 4SK such that the positioning recess groove 4SFKb provided on the recess portion 4SKFa of the fitting portion 4SKF of the unit housing 4SK is positioned on a line orthogonal to the line of the three through holes 442 and passing through the position of the center pin hole of the three pin holes 442 according to the position of the positioning projection portion 3Ka of the electronic pen body portion unit 3.

For the positioning and housing, a through opening 4SKo is provided at a predetermined angular position on the circumferential side surface of the unit housing 4SK in the embodiment as illustrated on the left side of FIG. 9C, and an elastic protrusion 45a to be fitted to the through opening 4SKo is formed at a predetermined position of the holder cover 45 of the secondary battery module 40. Furthermore, in the embodiment, the secondary battery module 40 is inserted from the back end side of the unit housing 4SK, and the elastic protrusion of the secondary battery module 40 is fitted to the through opening 4SKo of the unit housing 4SK. In this way, the secondary battery module 40 is locked in the hollow portion of the unit housing 4SK, and in this state, the secondary battery module 40 is housed such that the position of the positioning recess groove 4SKFb is at an expected correct position with respect to the arrangement direction of the three pogo pins 461, 462, and 463 of the secondary battery module 40.

Furthermore, in the embodiment, the position of the back end portion of the secondary battery module 40 in the axial direction substantially coincides with the position of the back end portion of the unit housing 4SK of the power supply portion unit 4S or is inside where it does not protrude with respect to the position of the back end portion of the unit housing 4SK of the power supply portion unit 4S. Furthermore, since the back end side of the unit housing 4SK is an opening, the USB connector 43 of the secondary battery module 40 is exposed from the opening on the back end side of the unit housing 4SK as illustrated in FIG. 9B. Therefore, as described above, if the lid portion 22b of the back end side housing portion 22 is removed when the unit coupling part 6S is housed in the electronic pen outer casing 2, the USB connector 43 of the secondary battery module 40 is exposed outside from the opening on the back end side of the back end side housing portion 22. As a result, a USB connector that fits the USB connector 43 can be fitted to the exposed USB connector 43 to charge the secondary battery 41 of the secondary battery module 40 from outside.

Next, an electrical coupling state between the electronic pen body portion unit 3 and the power supply portion unit 4S in the unit coupling part 6S formed by coupling the electronic pen body portion unit 3 and the power supply portion unit 4S will be illustrated in FIG. 10, and an electronic circuit formed in this case will be described with reference to FIG. 11.

Figures 10A, 10B, 10C:
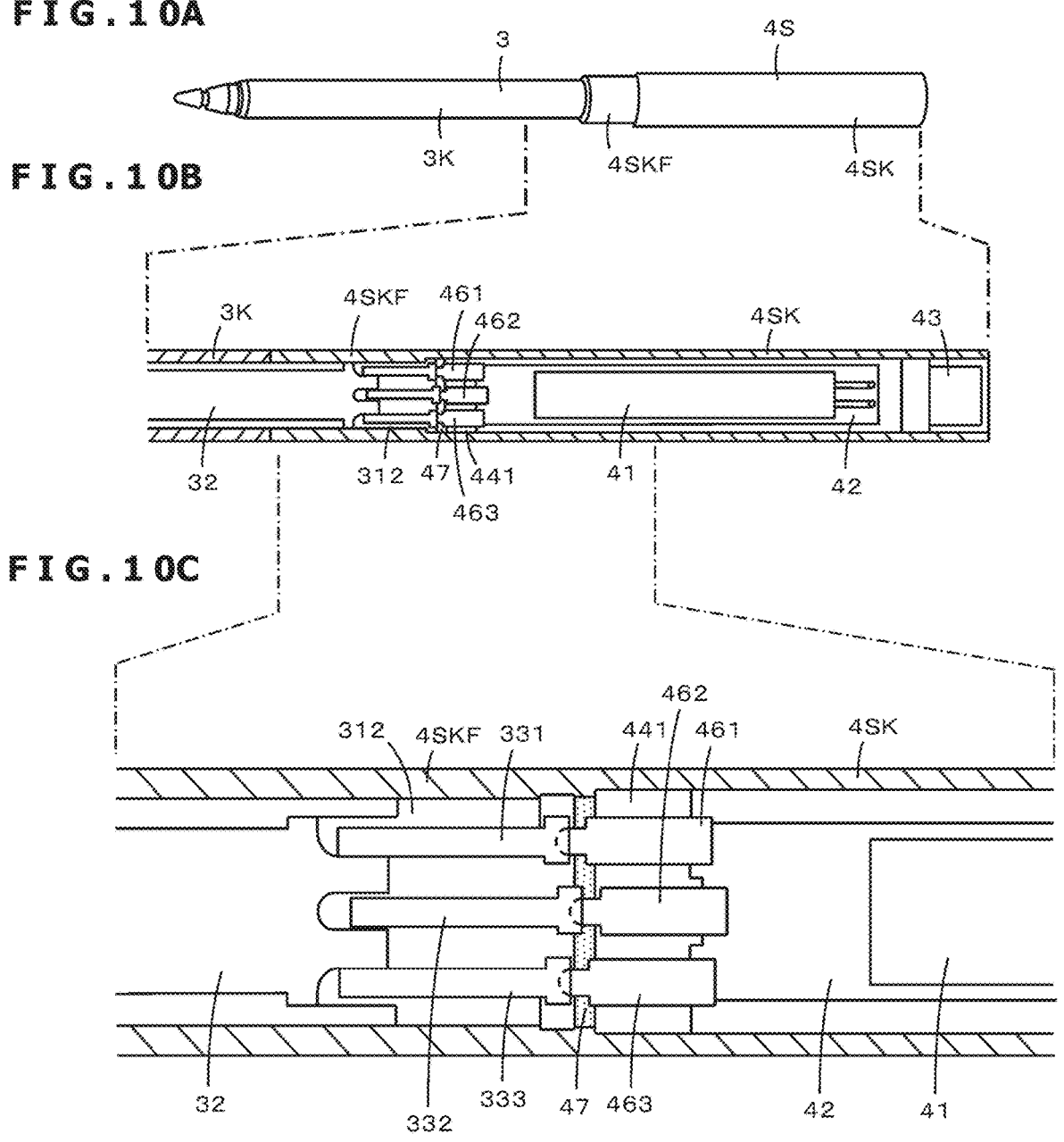
FIGS. 10A-10C depict diagrams for describing a configuration in which the power supply portion unit using the secondary battery as a power supply and the electronic pen body portion unit are coupled in the embodiment of the electronic pen according to the disclosure.

FIG. 10A illustrates the unit coupling part 6S. FIG. 10B is an enlarged cross-sectional view of the back end side including the coupling portion of the electronic pen body portion unit 3 and the power supply portion unit 4S. FIG. 10C is a further enlarged cross-sectional view of the coupling portion.

As illustrated in FIGS. 10B and 10C, when the back end portion of the electronic pen body portion unit 3 is fitted to the fitting portion 4SKF of the power supply portion unit 4S, the circular end surface of the columnar shape portion 312a of the terminal portion 312 of the electronic pen body portion unit 3 and the circular end surface of the terminal portion 441 of the power supply portion unit 4S collide with each other through the elastic rubber member 47. Furthermore, in the collided state, the three contact pins 331, 332, and 333 of the terminal portion 312 of the electronic pen body portion unit 3 and the three pogo pins 461, 462, and 463 of the power supply portion unit 4S are electrically connected, respectively, as illustrated in FIGS. 10B and 10C. In this case, although the positions of the head portions of the three contact pins 331, 332, and 333 of the terminal portion 312 of the electronic pen body portion unit 3 are different in the axial direction as described above, the contact portions on the power supply portion unit 4S side are the pogo pins 461, 462, and 463. Therefore, the pogo pins 461, 462, and 463 are elastically displaced in the axial direction, and the pogo pins 461, 462, and 463 are surely brought into contact with and electrically connected to the three contact pins 331, 332, and 333.

As a result, the electronic pen body portion unit and the power supply portion unit 4S are elastically coupled in the axial direction in the unit coupling part 6S.

As illustrated in FIG. 11, the pogo pin 461 is connected to the charging terminal of the USB connector 43, and the pogo pin 463 is connected to the earth terminal of the USB connector 43 in the power supply portion unit 4S. In addition, the pogo pin 462 is connected to the positive electrode terminal of the secondary battery 41. The negative electrode terminal of the secondary battery is connected to the pogo pin 463.

Furthermore, the contact pin 331 connected to the pogo pin 461 is connected to an input terminal of a charge circuit 361 in the electronic pen body portion unit 3. An output terminal of the charge circuit 361 is connected to an input terminal of a power supply voltage generation circuit 362 and is connected to the positive electrode terminal of the secondary battery 41 through the contact pin 332 and the pogo pin 462.

The charge circuit 361 supplies a charge current input from the USB connector 43 through the pogo pin 461 and the contact pin 331 to the secondary battery 41 through the contact pin 332 and the pogo pin 462 to charge the secondary battery 41.

The power supply voltage generation circuit 362 receives the voltage of the secondary battery 41 through the pogo pin 462 and the contact pin 332 and generates a power supply voltage +B. The generated power supply voltage +B is supplied to a signal transmission circuit 363, a signal reception circuit 364, and a control circuit 365. A variable capacitor 9C including the pen pressure detection portion 9 in the example is connected to the control circuit 365, and the control circuit 365 detects the pen pressure value from the capacitance of the variable capacitor 9C.

The signal transmission circuit 363 includes an oscillation circuit with a predetermined frequency and generates a signal according to the control of the control circuit 365. The signal transmission circuit 363 transmits the signal to the position detection sensor by capacitance coupling through the center electrode 51 of the core body 5. The signal transmitted from the signal transmission circuit 363 includes a position detection signal and an information signal of pen pressure value. The position detection signal is transmitted as a burst signal with a predetermined frequency, and the information of pen pressure value, which is the pen pressure value in the example, is converted into a binary digital signal. The binary digital signal is transmitted as, for example, an ASK (Amplitude Shift Keying) modulated signal or an OOK (On Off Keying) modulated signal.

The peripheral electrode 7 receives the signal from the position detection sensor by capacitance coupling and supplies the signal to the control circuit 365. The control circuit 365 controls the output timing of the signal from the signal transmission circuit 363 at timing based on the signal received from the position detection sensor.

In this way, in the electronic pen 1 in which the unit coupling part 6S is housed in the electronic pen outer casing 2, the electronic pen body portion unit 3 receives the voltage from the secondary battery 41 of the power supply portion unit 4S to generate the power supply voltage and transmits and receives the signal to and from the position detection sensor. In this way, the position detection sensor side can detect the position indicated by the electronic pen 1 and detect the pen pressure value applied to the front end of the core body 5.

In this case, the unit coupling part 6S is prevented from moving in the axial direction between the step portion 21s on the pen tip side and the lid portion 22b on the back end side in the electronic pen outer casing 2 of the electronic pen 1, and the presence of the elastic rubber member 47 and the elasticity of the pogo pins 461, 462, and 463 firmly and elastically couple the electronic pen body portion unit 3 and the power supply portion unit 4S. Therefore, the electronic pen body portion unit 3 and the power supply portion unit 4S are electrically and surely connected.

Configuration Example of Power Supply Portion Unit 4D

Figures 12A, 12B:
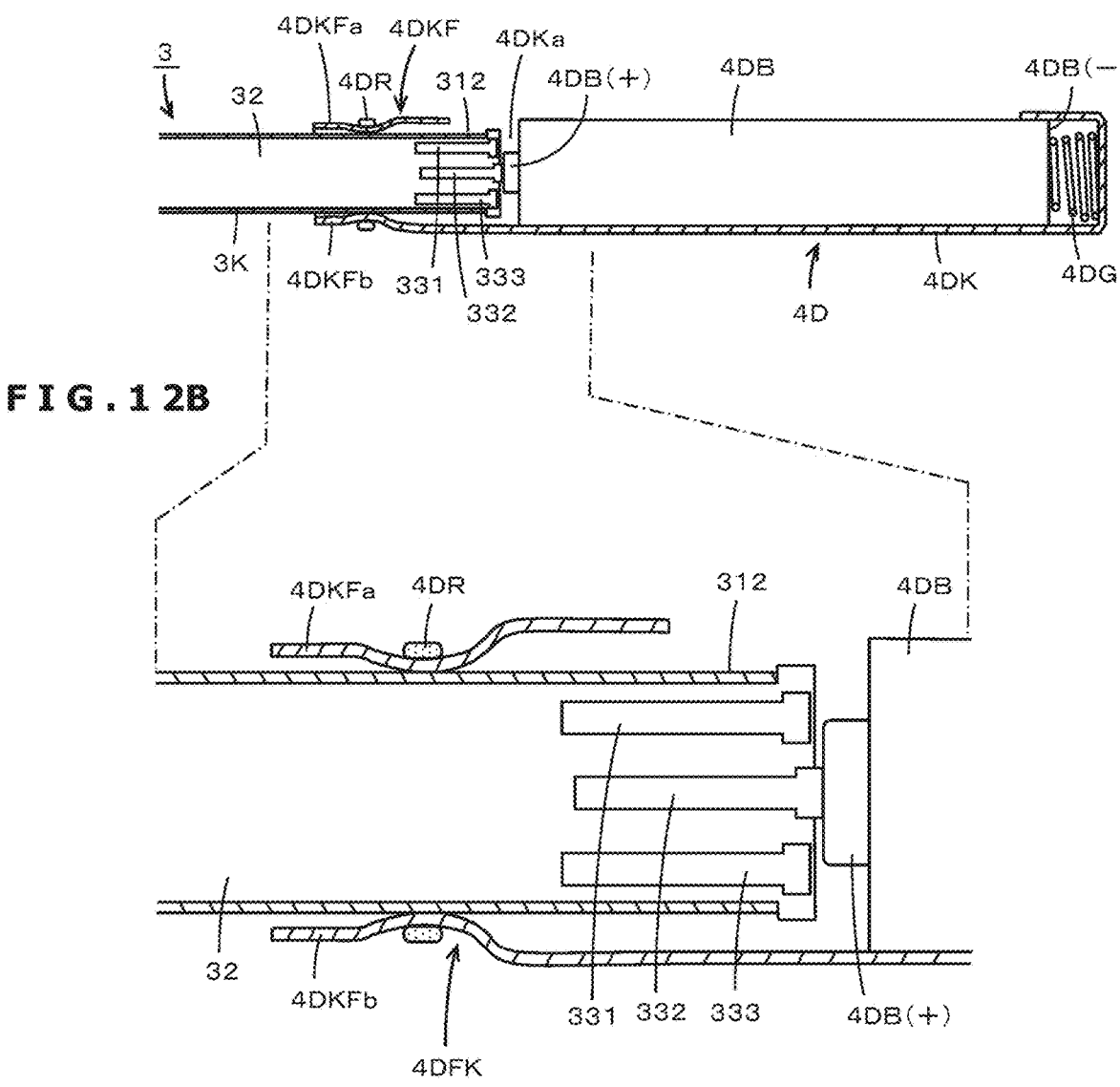
FIGS. 12A-12B depict diagrams for describing a configuration in which the power supply portion unit uses the primary battery as a power supply and the electronic pen body portion unit are coupled in the embodiment of the electronic pen according to the disclosure.

Next, a configuration example of the power supply portion unit 4D will be described with reference to FIG. 2B described above and FIG. 12. FIG. 12A is a cross-sectional view for describing the back end side of the coupling portion of the unit coupling part 6D in which the electronic pen body portion unit 3 and the power supply portion unit 4D are coupled. FIG. 12B is an enlarged cross-sectional view of the coupling portion in FIG. 12A. Note that, for the simplification of description, the cross section of the primary battery 4DB is not illustrated in FIG. 12.

The power supply portion unit 4D in the example includes the unit housing 4DK containing conductive metal and having a shape that allows the housing of the power supply portion unit 4D in the columnar housing space 2a of the electronic pen outer casing 2 as illustrated in FIG. 2B and as illustrated in FIG. 12A. In the unit housing 4DK of the power supply portion unit 4D, the middle of the tubular body in the axial direction is the opening 4DKa as illustrated in FIG. 2B and FIG. 12A, and the primary battery 4DB is removably housed from the opening 4DKa.

The back end side of the unit housing 4DK is blocked as illustrated in FIG. 12A, and a spring contact 4DG containing a conductive material, which is conductive metal in the example, that comes into contact with the negative electrode side 4DB (−) of the housed primary battery 4DB is provided inside the blocked section. The spring contact 4DG elastically biases the primary battery 4DB housed in the unit housing 4DK to the side coupled to the electronic pen body portion unit 3 all the time. In addition, the spring contact 4DG is electrically connected to the conductive unit housing 4DK in the example.

In addition, the positive electrode side 4DB (+) of the primary battery 4DB housed in the unit housing 4DK is exposed to the side coupled to the electronic pen body portion unit 3 as illustrated in FIGS. 12A and 12B.

Furthermore, in the embodiment, the fitting portion 4DKF of the unit housing 4DK of the power supply portion unit 4D on the side coupled to the electronic pen body portion unit 3 includes fitting pieces 4DKFa and 4DKFb formed at positions with an interval of 180 degrees in the end portion of the unit housing 4DK on the side coupled to the electronic pen body portion unit 3, the fitting pieces 4DKFa and 4DKFb formed by providing slits in the axial direction. The diameter of the fitting portion 4DKF at the middle position in the axial direction is narrowed down compared to the other sections as illustrated in FIGS. 2B, 12A, and 12B. In addition, an elastic ring 4DR containing an elastic material, which is rubber in the example, is wound around the narrowed section.

As illustrated in FIGS. 12A and 12B, when the back end portion of the electronic pen body portion unit 3 is inserted into the fitting portion 4DKF of the unit housing 4DK of the power supply portion unit 4D, the back end portion of the electronic pen body portion unit 3 is coupled at the fitting portion 4DKF of the unit housing 4DK in the state in which the back end portion is in firm contact with the fitting pieces 4DKFa and 4DKFb of the fitting portion 4DKF of the unit housing 4DK due to the elasticity of the elastic ring 4DR. In this way, the electronic pen body portion unit 3 and the power supply portion unit 4D are coupled to form the unit coupling part 6D as illustrated in FIG. 2C.

In the coupling state, the spring contact 4DG elastically biases the primary battery 4DB of the power supply portion unit 4D to the side coupled to the electronic pen body portion unit 3 all the time as illustrated in FIGS. 12A and 12B, and the positive electrode side 4DB (+) of the primary battery 4DB is pressed and connected to the center contact pin 332 protruding in the axial direction among the three contact pins 331, 332, and 333 of the terminal portion 312 of the electronic pen body portion unit 3. That is, when the electronic pen body portion unit 3 and the power supply portion unit 4D are coupled, the two contact pins 331 and 333 on both sides of the terminal portion 312 of the electronic pen body portion unit 3 are not used as electrical points of contact.

Furthermore, in the unit coupling part 6D in which the electronic pen body portion unit 3 and the power supply portion unit 4D are coupled, the negative electrode side 4DB (−) of the primary battery 4DB serves as an earth electrode of the circuit board 32 of the electronic pen body portion unit 3 through the spring contact 4DG, the unit housing 4DK, and the conductive unit housing 3K of the electronic pen body portion unit 3 as illustrated in FIGS. 12A and 12B.

In this case, in the unit coupling part 6D in which the power supply portion unit 4D and the electronic pen body portion unit 3 are coupled, it is only necessary that the contact pin 332 at the center position on the circular end surface of the terminal portion 312 and the positive electrode side 4DB (+) of the primary battery 4DB come into contact with each other, and the adjustment of the positions of the points of contact to be connected to each other is not necessary unlike in the case of coupling the power supply portion unit 4S and the electronic pen body portion unit 3. Furthermore, in the embodiment, the primary battery 4DB is also biased by the spring contact 4DG in the unit coupling part 6D. Therefore, the electronic pen body portion unit and the power supply portion unit 4D are elastically coupled in the axial direction, and the electrical connection is surely made.

Figure 13:
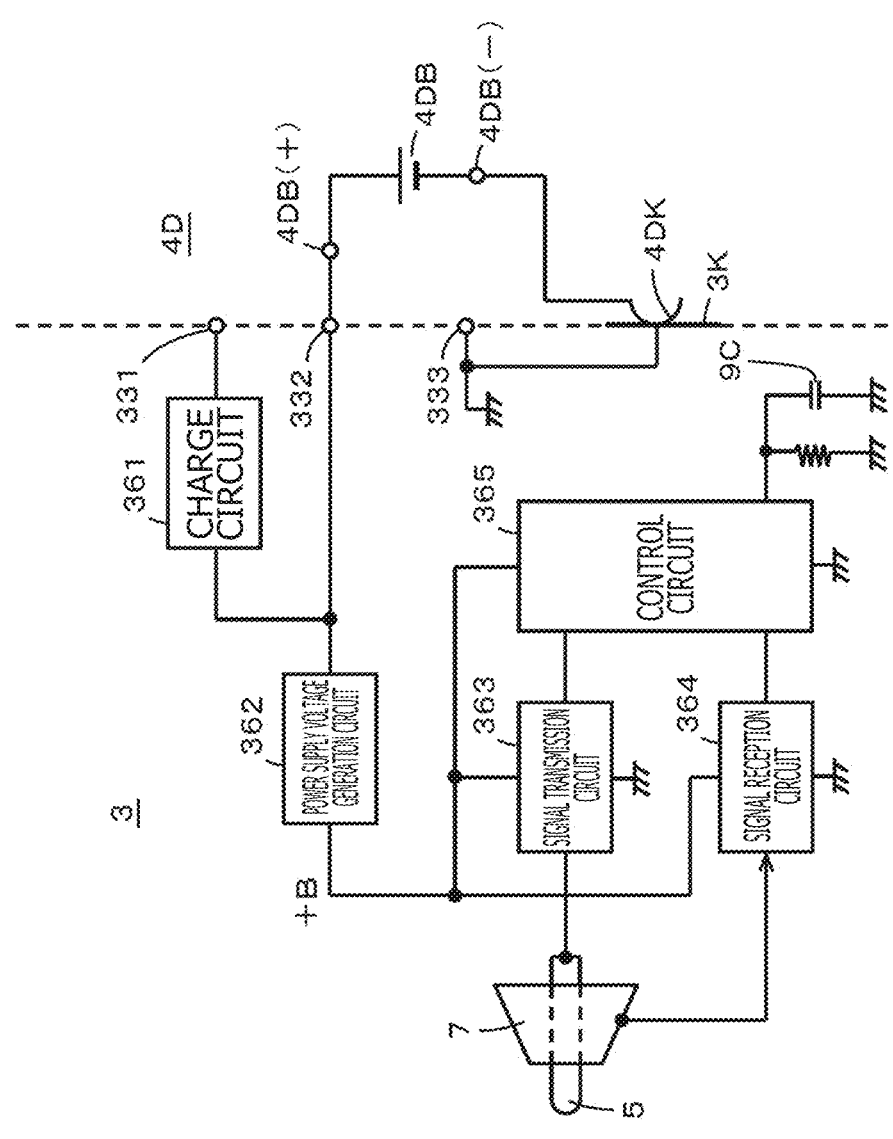
FIG. 13 is a circuit diagram for describing electrical connection in the configuration in which the power supply portion unit uses the primary battery as a power supply and the electronic pen body portion unit are coupled in the embodiment of the electronic pen according to the disclosure.

The electrical configuration in the unit coupling part 6D of the example in which the power supply portion unit 4D and the electronic pen body portion unit 3 are coupled is as illustrated in FIG. 13.

That is, as illustrated in FIG. 13, the positive electrode side 4DB (+) of the primary battery 4DB is connected to the contact pin 332 of the electronic pen body portion unit 3 in the case of the unit coupling part 6D, and the negative electrode side 4DB (−) of the primary battery 4DB is connected to the earth electrode of the electronic pen body portion unit 3 through the unit housing 4DK and the unit housing 3K.

Therefore, in the case of the unit coupling part 6D, the charge circuit 361 is not operated in the electronic pen body portion unit 3, and the power supply voltage generation circuit 362 generates the power supply voltage +B based on the voltage from the primary battery 4DB and supplies the power supply voltage +B to the signal transmission circuit 363, the signal reception circuit 364, and the control circuit 365. Furthermore, in the case of the unit coupling part 6D, only the supply source of the power supply voltage is different, and the electronic pen body portion unit 3 executes the function of the electronic pen body portion as in the case of the unit coupling part 6S.

Advantageous Effects of Electronic Pen 1 of Embodiment

As described above, the electronic pen 1 of the embodiment includes four unit parts including the pen tip side housing portion 21, the back end side housing portion 22, the electronic pen body portion unit 3, and one of the power supply portion units 4S and 4D, and the four unit parts can be used to assemble the electronic pen 1. Therefore, when one of the four unit parts is damaged or malfunctioned, only the damaged or malfunctioned unit part can be replaced to repair the electronic pen 1.

Furthermore, in the electronic pen 1 of the embodiment, there is an advantageous effect that the electronic pen body portion unit 3 and one of the power supply portion units 4S and 4D can be coupled to generate the unit coupling part 6S or 6D, and the pen tip side housing portion 21 and the back end side housing portion 22 can be coupled so as to cover the generated unit coupling part 6S or 6D from both the pen tip side and the back end side to thereby easily form the electronic pen 1.

Furthermore, in the electronic pen 1 of the embodiment, the terminal portion 312 is formed in the electronic pen body portion unit 3 such that either one of the power supply portion unit 4S with the secondary battery and the power supply portion unit 4D with the primary battery can be used as a power supply portion unit. Therefore, the power supply portion unit can be selected and used according to the user's preference or the usage, and this is very convenient.

Furthermore, the core body 5 is supported by the pen tip side of the electronic pen body portion unit 3 in the electronic pen 1 of the embodiment, and the pen tip side opening of the pen tip side housing portion 21 of the electronic pen outer casing 2 does not have to be configured to support the core body 5. Therefore, the pen tip side housing portion 21 does not have to be designed in consideration of the diameter of the core body 5 or the like. This can increase the degree of freedom of design, and thus, increase the degree of freedom of design of the electronic pen outer casing.

Modifications of the Embodiment

Note that although the peripheral electrode 7 is used only to receive the signal by capacitance coupling through the position detection sensor in the example, the signal from the signal transmission circuit 363 may be transmitted through the peripheral electrode 7. The position detection sensor side can use the signal transmitted from the peripheral electrode 7 for the tilt of the electronic pen 1 with respect to the input surface of the position detection sensor.

In addition, although the back end side of the electronic pen body portion unit 3 is fitted to the recess portion on the pen tip side of the power supply portion unit in the embodiment, the pen tip side of the power supply portion unit may be conversely fitted to the recess portion on the back end side of the electronic pen body portion unit 3.

In addition, the configuration of the electrical connection section of the electronic pen body portion unit 3 and one of the power supply portion units 4S and 4D is not limited to the configuration of using a plurality of contact pins as in the example, and various other configurations are possible.

FIG. 14 depicts diagrams illustrating another configuration example of the electrical connection section of the electronic pen body portion unit 3 and one of the power supply portion units 4S and 4D. A connector plug 3P as an example of a first terminal portion is provided on the back end side of an electronic pen body portion unit 3A of the example, and connector jacks 4SJ and 4DJ fitted with the connector plug 3P as examples of a second terminal portion are provided on power supply portion units 4SA and 4DA of the example.

FIGS. 14A to 14E are diagrams for describing a first configuration example of the connector plug 3P of the electronic pen body portion unit 3A and the connector jacks 4SJ and 4DJ of the power supply portion units 4SA and 4DA. In addition, FIG. 14F is a diagram for describing a second configuration example.

The connector plug 3P of the first configuration example is provided on the end surface of the electronic pen body portion unit 3A on the side coupled to the power supply portion unit 4SA or 4DA as illustrated in FIG. 14A. In addition, the connector jacks 4SJ and 4DJ of the first configuration example are provided on the end surfaces of the power supply portion unit 4SA and the power supply portion unit 4DA on the sides coupled to the electronic pen body portion unit 3A as illustrated in FIGS. 14B and 14C. FIGS. 14D and 14E are diagrams for describing electrical connection relations between the connector plug 3P and the connector jacks 4SJ and 4DJ in the first configuration example.

The connector plug 3P of the electronic pen body portion unit 3A is electrically connected to an electronic circuit formed on the circuit board 32 of the electronic pen body portion unit 3A, and the connector plug 3P includes a plurality of terminals, which are three terminals 371, 372, and 373 in the example, insulated from each other. The three terminals 371, 372, and 373 correspond to the contact pins 331, 332, and 333 of the terminal portion 312 of the electronic pen body portion unit 3, respectively.

The configuration of the three terminals 371, 372, and 373 of the connector plug 3P in the first configuration example included in the electronic pen body portion unit 3A is as follows. That is, the terminal 371 in the example contains conductor metal included in a center shaft. In addition, the cylindrical terminals 372 and 373 provided with insulating layers on inner wall surfaces are concentrically combined on the rod-shaped conductor metal of the terminal 371 to form the connector plug 3P in the example.

In this case, as illustrated in FIG. 14A, the terminal 371 containing the conductor metal included in the center shaft is the front end portion in the axial direction. The annular peripheral surface and the front end of the terminal 371 are exposed by predetermined lengths in the axial direction, and the annular peripheral surfaces of the cylindrical terminals 372 and 373 are exposed by predetermined lengths in the axial direction. That is, the circular conductor contact portions of the three terminals 371, 372, and 373 of the connector plug 3P are exposed at different positions in the axial direction. Note that although the terminal 371 has a columnar shape, the annular circumferential side surface and the front end portion of the terminal 371 form the conductor contact portion.

In addition, the connector jack 4SJ of the power supply portion unit 4SA includes a recess portion into which the connector plug 3P is inserted as illustrated in FIG. 14B, and three contact point terminals 4SJ1, 4SJ2, and 4SJ3 elastically brought into contact with the three terminals 371, 372, and 373 of the connector plug 3P are provided in the recess portion as illustrated in FIG. 14D. The three contact point terminals 4SJ1, 4SJ2, and 4SJ3 contain conductive elastic metal, and the three contact point terminals 4SJ1, 4SJ2, and 4SJ3 correspond to the three pogo pins 461, 462, and 463 of the power supply portion unit 4S, respectively. The three contact point terminals 4SJ1, 4SJ2, and 4SJ3 are connected to an electronic circuit arranged on the circuit board 42 of the power supply portion unit 4SA.

In addition, the connector jack 4DJ of the power supply portion unit 4DA includes a recess portion into which the connector plug 3P is inserted as illustrated in FIG. 14C, and two contact point terminals 4DJ2 and 4DJ3 elastically brought into contact with the two terminals 372 and 373 of the three terminals 371, 372, and 373 of the connector plug 3P excluding the terminal 371 that is a charging terminal are provided in the recess portion as illustrated in FIG. 14E. The contact point terminals 4DJ2 and 4DJ3 contain conductive elastic metal. The contact point terminal 4DJ2 is connected to the positive electrode side (+) of the primary battery 4DB housed in the power supply portion unit 4DA, and the contact point terminal 4DJ3 is connected to the negative electrode side (−) of the primary battery 4DB. Note that the configuration of the connector jack 4DJ may be the same as the configuration of the connector jack 4SJ, and the terminal 371 may be a free end not electrically connected to anything in the power supply portion unit 4DA.

When the connector plug 3P of the electronic pen body portion unit 3A is inserted into the connector jack 4SJ of the power supply portion unit 4SA, the three terminals 371, 372, and 373 of the connector plug 3P are elastically connected to the three contact point terminals 4SJ1, 4SJ2, and 4SJ3 provided on the connector jack 4SJ, respectively, as illustrated in FIG. 14D. In this way, an electronic circuit similar to the electronic circuit illustrated in FIG. 11 is formed. The power supply voltage is supplied from the secondary battery 41 of the power supply portion unit 4SA to the electronic pen body portion unit 3A, and the secondary battery 41 can be charged.

In addition, when the connector plug 3P of the electronic pen body portion unit 3A is inserted into the connector jack 4DJ of the power supply portion unit 4DA, the two terminals 372 and 373 of the three terminals 371, 372, and 373 of the connector plug 3P are elastically connected to the two contact point terminals 4DJ2 and 4DJ3 provided on the connector jack 4DJ, respectively, as illustrated in FIG. 14E. In this way, an electronic circuit similar to the electronic circuit illustrated in FIG. 13 is formed, and the power supply voltage is supplied from the primary battery 4DB of the power supply portion unit 4DA to the electronic pen body portion unit 3A.

In the electronic pen body portion unit 3A of the second example in FIG. 14F, the configuration of three terminals 381, 382, and 383 of the connector plug 3P is as follows. The configuration of the connector plug 3P in the example is similar to the configuration of, for example, an audio pin plug, and circular conductor contact portions with the same diameter in the three terminals 381, 382, and 383 are exposed at different positions in the axial direction in the example.

That is, the terminal 381 at the front end among the three terminals 381, 382, and 383 is a chip terminal, and the two middle terminals 382 and 383 are circular terminals insulated from the other terminals by insulating rings 39a, 39b, and 39c.

The configuration of the connector jacks of the power supply portion unit 4SA and the power supply portion unit 4DA coupled to the connector plug 3P of the electronic pen body portion unit 3A in the second configuration example is well known, and the configuration will not be illustrated. As in the first example, the power supply portion unit 4SA includes three contact point terminals brought into contact with and electrically connected to the circular conductor contact portions of the three terminals 381, 382, and 383, respectively, and the power supply portion unit 4DA includes two contact point terminals brought into contact with and electrically connected to the circular conductor contact portions of the two terminals 382 and 383 among the circular conductor contact portions of the three terminals 381, 382, and 383, respectively.

In this way, in the examples illustrated in FIG. 14, the connector plug 3P provided on the electronic pen body portion unit 3A can be inserted and fitted to the connector jack 4SJ or the connector jack 4DJ provided on the power supply portion unit 4SA or the power supply portion unit 4DA to thereby form the unit coupling part 6S or 6D as in the embodiment.

In this case, the circular conductor contact portions of the connector plug 3P are connected to the contact point terminals of the connector jacks 4SJ and 4DJ in the examples of FIG. 14. Therefore, even if the electronic pen body portion unit 3A is rotated about the center line in the axial direction, the electrical connection is maintained all the time, and electrical non-contact can be prevented. That is, positioning members that adjust the positions for connecting a plurality of terminals are not necessary in coupling the electronic pen body portion unit 3A and one of the power supply portion units 4SA and 4DA.

Note that, in the examples of FIG. 14, the connector plug is provided on the electronic pen body portion unit 3A, and the connector jack is provided on the power supply portion unit 4SA or 4DA side. Conversely, the connector jack may be provided on the electronic pen body portion unit 3A, and the connector plug may be provided on the power supply portion unit 4SA or 4DA side.

Other Embodiments or Modifications

Although the charge circuit of the secondary battery 41 of the power supply portion unit 4S or 4SA is provided on the electronic pen body portion unit 3 or 3A in the embodiment, the charge circuit may be obviously provided on the power supply portion unit 4S or 4SA. In that case, the power supply portion unit 4S or 4SA needs to include only two terminals, which are the positive electrode side (+) and the negative electrode side (−) of the secondary battery 41, for electrical connection to the electronic pen body portion unit 3 as in the power supply portion unit 4D or 4DA. Therefore, the positions of the head portions of the three contact pins 331, 332, and 333 of the terminal portion 312 of the electronic pen body portion unit 3 do not have to be different in the axial direction in that case.

Furthermore, the secondary battery 41 of the power supply portion unit 4S or 4SA can be charged in the state in which the unit coupling part 6S is housed in the electronic pen 1 or in the state in which the power supply portion unit 4S or 4SA is removed from the electronic pen 1.

In addition, although the power supply portion unit 4S or 4SA of the secondary battery and the power supply portion unit 4D or 4DA of the primary battery can be exchanged in the power supply portion unit in the embodiment, only one of the power supply portion unit of the secondary battery and the power supply portion unit of the primary battery may be coupled to the electronic pen body portion unit 3 in the power supply portion unit.

In addition, when only the power supply portion unit 4D with the primary battery 4DB is to be coupled to the electronic pen body portion unit 3, the connection pin of the terminal portion 312 of the electronic pen body portion unit 3 that needs to be provided is only the contact pin 332 that is provided at the center of the circular end surface and that is to be connected to the positive electrode terminal of the primary battery. This significantly simplifies the configuration of the terminal. Obviously, the connection terminals corresponding to two terminals, which are the positive electrode terminal and the negative electrode terminal of the primary battery, can be provided as in the configuration example of the electronic pen body portion unit 3A and the power supply portion unit 4DA.

Although the configuration of the electronic pen body portion unit of the electronic pen is the configuration in the case of the electronic pen of active capacitance in the embodiment, it is obvious that the configuration may be a configuration in the case of an electronic pen of electromagnetic resonance system. In the case of the electromagnetic resonance system, the core body is fitted to a pen pressure transmission member through a through hole provided on a magnetic core (such as a ferrite core) wound around a coil. In that case, the pen pressure transmission member can also be divided into the core body holding member and the pressing member to obtain the advantageous effect of the embodiment that the pen pressure can be appropriately detected even when the electronic pen is tilted.

Furthermore, in the electronic pen body portion in the case of the electromagnetic resonance system, a constituent part similar to the peripheral electrode 7 of the electronic pen body portion unit 3 can be provided, or the front end portion of the pen tip side housing portion 21 can be similar to the front end portion of the peripheral electrode to thereby support the middle of the core body. This can reduce the shift of the other end side of the core body and the pen pressure transmission member from the axial direction when the electronic pen is tilted, and an advantageous effect similar to the advantageous effect of the electronic pen 1 with the electronic pen body portion unit 3 can be obtained.

Note that the pen pressure detection portion is not limited to the configuration in the embodiment. For example, the pen pressure detection portion that detects the pen pressure by capacitance may include a semiconductor device in which the distance between two electrodes facing each other through an air layer that is a dielectric varies according to the applied pressure (for example, see Patent Literature: Japanese Patent Laid-Open No. 2013-161307). Furthermore, instead of detecting the pen pressure by capacitance, the pen pressure may be detected by a change in inductance.

DESCRIPTION OF REFERENCE SYMBOLS

1: Electronic pen
2: Electronic pen outer casing
3, 3A: Electronic pen body portion unit
4S, 4D, 4SA, 4DA: Power supply portion unit
4 DB: Primary battery
5: Core body
6S, 6D: Unit coupling part
7: Peripheral electrode
8: Pen pressure transmission member
9: Pen pressure detection portion
21: Pen tip side housing portion
22: Back end side housing portion
42: Secondary battery
312, 441: Terminal portion
331, 332, 333: Contact pin
461, 462, 463: Pogo pin
The invention claimed is:
1. An electronic pen comprising:
an electronic pen body portion unit with a function of interaction of a signal to and from a position detection sensor;
a power supply portion unit that supplies a power supply voltage to the electronic pen body portion unit; and
a first housing portion and a second housing portion that form an electronic pen outer casing including a columnar housing space inside when the first housing portion and the second housing portion are coupled in an axial direction of the columnar housing space, wherein:

the electronic pen body portion unit has a columnar shape allowing the electronic pen body portion unit to be housed in the columnar housing space, wherein a core body is installable on one end side of the columnar shape in the axial direction, and the electronic pen body portion unit includes an electrical first terminal portion on an opposite side of the side on which the core body is installed, the power supply portion unit has a columnar shape allowing the power supply portion unit to be housed in the columnar housing space and includes, on the one end side of the columnar shape in the axial direction, a second terminal portion electrically connected to at least part of the first terminal portion of the electronic pen body portion unit, in the columnar housing space of the electronic pen outer casing, the electronic pen body portion unit and the power supply portion unit, lined up and arranged in the axial direction of the columnar housing space in a state in which the power supply portion unit is on a back end side, remain in position in the axial direction of the columnar housing space and the first terminal portion and the second terminal portion are electrically connected, the electronic pen body portion unit includes the first terminal portion on a first end surface on the opposite side of the side of the columnar shape in the axial direction where the core body is installed, the power supply portion unit includes the second terminal portion on a second end surface on the one end side of the columnar shape in the axial direction, and in the columnar housing space of the electronic pen outer casing, the electronic pen body portion unit and the power supply portion unit are lined up and arranged in the axial direction of the columnar housing space in a state in which the first end surface provided with the first terminal portion and the second end surface provided with the second terminal portion face each other.

2. The electronic pen according to claim 1, wherein the first housing portion includes a pen tip side opening for a front end portion of the core body to protrude outside, the second housing portion is removably coupled to the first housing portion on an opposite side of the pen tip side opening to form the electronic pen outer casing, and the columnar housing space of the electronic pen outer casing is formed by communication of an internal space of the first housing portion and an internal space of the second housing portion.

3. The electronic pen according to claim 1, wherein the first housing portion and the second housing portion are coupled by screwing.

4. The electronic pen according to claim 1, wherein at least one of the first terminal portion on the first end surface and the second terminal portion on the second end surface is elastically displaceable in the axial direction of the columnar housing space.

5. The electronic pen according to claim 1, wherein at least one of the first terminal portion on the first end surface or the second terminal portion on the second end surface includes a pogo pin that is elastically displaceable in the axial direction of the columnar housing space.

6. The electronic pen according to claim 1, wherein the power supply portion unit includes a rechargeable secondary battery as a power supply and includes a charging terminal portion that is exposable outside through the second housing portion.

7. The electronic pen according to claim 6, wherein the charging terminal is provided in a state in which the charging terminal is exposed from an end surface of the power supply portion unit on the back end side, and a lid portion that blocks an opening on the back end side in the axial direction is removably installed on the second housing portion.

8. The electronic pen according to claim 1, wherein the power supply portion unit includes a columnar primary battery as a power supply, in which one end side of the columnar shape in the axial direction is one of a positive electrode and a negative electrode and another end side of the columnar shape in the axial direction is the other of the positive electrode and the negative electrode.

9. The electronic pen according to claim 1, wherein the power supply portion unit includes a columnar primary battery as a power supply, in which one end side of the columnar shape in the axial direction is one of a positive electrode and a negative electrode, and another end side of the columnar shape in the axial direction is the other of the positive electrode and the negative electrode, the positive electrode of the primary battery is exposed from the second end surface to form the second terminal portion, an elastic member is provided on the negative electrode side of the primary battery, and the positive electrode of the primary battery on the second end surface side is to be elastically displaced toward the first end surface of the electronic pen body portion unit.

10. The electronic pen according to claim 1, wherein the electronic pen body portion unit and the power supply portion unit are locked in a state in which one of the electronic pen body portion unit and the power supply portion unit is inserted into a recess portion provided on the other of the electronic pen body portion unit and the power supply portion unit in the axial direction of the columnar shape.

11. The electronic pen according to claim 1, wherein the electronic pen body portion unit and the power supply portion unit are locked in a state in which the first terminal portion and the second terminal portion are electrically connected when one of the electronic pen body portion unit and the power supply portion unit is inserted into a recess portion provided on the other of the electronic pen body portion unit and the power supply portion unit in the axial direction of the columnar shape.

12. The electronic pen according to claim 11, wherein the first terminal portion includes a plurality of points of contact, the second terminal portion includes a plurality of points of contact brought into contact with and electrically connected to the plurality of points of contact of the first terminal portion, respectively, and a positioning protrusion is formed on one of the recess portion and an area inserted into the recess portion, and a positioning recess groove into which the protrusion is inserted is formed on the other of the recess portion and the area such that the plurality of points of contact of the first terminal portion and the plurality of points of contact of the second terminal portion corresponding to each other come into contact with each other.

13. The electronic pen according to claim 11, wherein a functional portion that transmits and receives a signal to and from the position detection sensor is housed in a tubular housing containing conductive metal to form the electronic pen body portion unit, an earth side of the functional portion is electrically connected to the tubular housing containing the conductive metal, and the recess portion is provided on the power supply portion unit side, and when the electronic pen body portion unit is fitted to the recess portion, a conductor portion connected to the earth side of an internal power supply of the power supply portion unit comes into contact with a circumferential surface of the tubular housing containing the conductive metal of the electronic pen body portion unit.

14. The electronic pen according to claim 1, wherein the power supply portion unit includes:

a first power supply portion unit including a rechargeable secondary battery as a power supply and including a charging terminal portion that is exposable outside through the second housing portion, and a second power supply portion unit including a primary battery as a power supply, in which one end side of the columnar shape in the axial direction is one of a positive electrode and a negative electrode, and another end side of the columnar shape in the axial direction is the other of the positive electrode and the negative electrode, and the first terminal portion of the electronic pen body portion unit, the second terminal portion of the first power supply portion unit, and the second terminal portion of the second power supply portion unit are formed such that the electronic pen body portion unit is connectable to either one of the first power supply portion unit and the second power supply portion unit.

15. The electronic pen according to claim 14, wherein the first terminal portion of the electronic pen body portion unit includes a plurality of points of contact, a point of contact for receiving a power supply voltage of the secondary battery or the primary battery among the plurality of points of contact is a point of contact commonly used by the first power supply portion unit and the second power supply portion unit, and a relation between contact and non-contact of another point of contact varies between the first power supply portion unit and the second power supply portion unit.

16. The electronic pen according to claim 15, wherein the point of contact for receiving the power supply voltage is a point of contact electrically connected to the positive electrode and/or the negative electrode of the secondary battery or the primary battery, and the other point of contact is a contact point for charging the secondary battery.

17. The electronic pen according to claim 1, wherein the electronic pen body portion unit has a function of electromagnetic resonance system.

18. The electronic pen according to claim 1, wherein the electronic pen body portion unit has a function of active capacitance system, in the core body, a pen tip side of a center electrode including a conductor is covered by an insulating material, and the electronic pen body portion unit includes an opening on the side on which the core body is installed and includes a peripheral electrode arranged to cover around the installed core body, and a front end portion of the peripheral electrode on the opening side supports the installed core body such that the core body is movable in the axial direction at a section of the insulating material of the core body.

19. The electronic pen according to claim 1, wherein the first terminal portion of the electronic pen body portion unit includes a first connector plug or a first connector jack, and the second terminal portion of the power supply portion unit includes a second connector jack or a second connector plug fitted to the first connector plug or the first connector jack of the first terminal portion of the electronic pen body portion unit.

* * * * *